United States Patent
Beck et al.

(10) Patent No.: US 6,273,076 B1
(45) Date of Patent: Aug. 14, 2001

(54) OPTIMIZED LAMBDA AND COMPRESSION TEMPERATURE CONTROL FOR COMPRESSION IGNITION ENGINES

(75) Inventors: Niel Lenannes Beck, Bonita; Kresimir Gebert, San Diego; Hoi Ching Wong, Carlsbad, all of CA (US)

(73) Assignee: Servojet Products International, San Diego, CA (US)

( * ) Notice: Subject to any disclaimer, the term of this patent is extended or adjusted under 35 U.S.C. 154(b) by 0 days.

(21) Appl. No.: 08/991,413

(22) Filed: Dec. 16, 1997

(51) Int. Cl.$^7$ ............................................... E02D 41/04
(52) U.S. Cl. ..................... 123/679; 123/562; 123/565; 123/689; 60/599; 60/612
(58) Field of Search .................................. 123/679, 689, 123/562, 563, 565, 704; 60/599, 612

(56) References Cited

U.S. PATENT DOCUMENTS

| | | | |
|---|---|---|---|
| 2,703,560 | * 3/1955 | Lieberherr | 123/563 |
| 4,285,200 | 8/1981 | Byrne et al. | 60/607 |
| 4,364,364 | 12/1982 | Subramaniam | 123/527 |
| 4,603,674 | 8/1986 | Tanaka | 123/575 |
| 4,622,939 | 11/1986 | Matekunas | 123/425 |
| 4,769,995 | 9/1988 | Serve et al. | 60/603 |
| 4,849,897 | 7/1989 | Ciccarone | 364/431.08 |
| 4,873,961 | 10/1989 | Tanaka | 123/564 |
| 4,928,653 | 5/1990 | Ohkubo et al. | 123/435 |
| 5,067,460 | 11/1991 | Van Duyne | 123/337 |
| 5,069,185 | 12/1991 | Evasick | 123/435 |
| 5,123,391 | 6/1992 | Ohkubo et al. | 123/435 |
| 5,133,188 | * 7/1992 | Okada | 123/562 |
| 5,150,694 | 9/1992 | Currie et al. | 123/569 |
| 5,157,924 | * 10/1992 | Sudmanns | 60/612 |
| 5,375,577 | 12/1994 | Betts, Jr. et al. | 123/480 |
| 5,415,147 | * 5/1995 | Nagle et al. | 123/563 |
| 5,454,360 | 10/1995 | Shimizu et al. | 123/564 |
| 5,458,102 | 10/1995 | Tomisawa et al. | 123/435 |

(List continued on next page.)

OTHER PUBLICATIONS

Evolution of Heavy Duty Natural Gas Engines—Stoichiometric, Carbureted and Spark Ignited to Lean Burn, Fuel Injected and Micro–Pilot; BKM, Inc.; N. John Beck et al. Doc. No. 972665.

(List continued on next page.)

Primary Examiner—Erick Solis
(74) Attorney, Agent, or Firm—Boyle Fredrickson Newholm Stein & Gratz S.C.

(57) ABSTRACT

The performance of a compression ignition internal combustion engine is improved by optimizing excess air ratio (lambda) and/or intake air charge temperature (ACT) on a full time, full range basis. The basic procedure is to first determine the desired or optimum lambda and then to control ACT and intake manifold absolute pressure (MAP) to maintain them at the optimum values for the fuel quantity required at a particular operating point. This approach allows control of both temperature and pressure of the air entering the engine. Full range control requires that lambda and ACT be controlled both upward and downward to achieve optimal engine performance. Control of both lambda and ACT is further enhanced through the use of a supercharger with adjustable input power installed in series with a standard turbocharger compressor of the engine. Supercharger control may if desired be supplemented with turbo air bypass (TAB) control, turbocharger variable area nozzle or wastegate, turboexpander control, and intake and exhaust valve control including skip fire of both fuel and air. The essence of optimized lambda control is to measure the physical properties of the working fluid in the intake manifold, exhaust manifold, or both, compute the actual value of lambda, and compare that actual value with an optimum value for the prevailing engine operating conditions. This comparison yields an error signal which is then used to control the magnitude of the required adjustment in turbocharger pressure or other engine operating parameter.

47 Claims, 14 Drawing Sheets

U.S. PATENT DOCUMENTS

| | | | |
|---|---|---|---|
| 5,471,965 | 12/1995 | Kapich | 123/565 |
| 5,492,103 * | 2/1996 | Goto | 123/563 |
| 5,526,645 | 6/1996 | Kaiser | 60/611 |
| 5,553,575 | 9/1996 | Beck et al. | 123/198 |
| 5,608,161 | 3/1997 | Pischinger | 73/117.3 |
| 5,657,630 * | 8/1997 | Kjemtrup et al. | 123/563 |
| 5,765,532 | 6/1998 | Loye | 123/435 |
| 5,768,887 * | 6/1998 | Nakamura et al. | 123/704 |
| 5,791,316 * | 8/1998 | Houtz et al. | 123/563 |
| 5,924,286 * | 7/1999 | Kapich | 123/565 |

OTHER PUBLICATIONS

Strategies to Improve Combustion and Emission Characteristics of Dual–Fuel Pilot Ignited Natural Gas Engines; BKM, Inc.; K. Gebert et al. Doc. No. 971712.

GCQ—A Universal Gaseous Fuel Composition and Quality Sensor; BKM Inc.; N.J. Beck et al. Doc. No. SAE 932824; pp. 1–12.

Dual Fuel Natural Gas/Diesel Engines: Technology, Performance, and Emissions; Engine, Fuel, and Emissions Engineering, Inc.; C. Weaver et al. Doc. No. 940548; pp. 77–92.

Schwitzer Variable Geometry Turbo and Microprocessor Control Design and Evaluation; SAE Technical Paper Series; Doc. No. 870296; Feb. 23–27, 1987; pp. 1–12.

Advanced Fuel Economy in Hino New P11C Turbocharged and Charge–Cooled Heavy Duty Diesel Engine; SAE Technical Paper Series; Doc. No. 930272; Mar. 1–5, 1993; pp. 49–60.

Engine Control Using Cylinder Pressure: Past, Present, and Future; J. David Powell; Journal of Dynamic Systems, Measurement, and Control; Jun. 1993, vol. 115, pp. 343–350.

State–of–the–Art; Hino High Boosted Diesel Engine; SAE Technical Paper Series; Doc No. 931867; Nov. 15–19, 1993; pp. 1–15.

A Next Generation Variable Turbine Geometry turbocharger for Highly Rated Diesel Truck Engines; Rochford et al.; Allied Signal Incorporated; Paper No. 234; Nov. 4–9, 1995; pp. 1–4.

S. P. Edwards, A. D. Pilley, S. Michon, and G. Fournier; The Optimisation of Common Rail FIE Equipped Engines Through the Use of Statistical Experimental Design, Mathematical Modelling and Genetic Algorithms; *Society of Automotive Engineers, Inc.*; 1997; pp. 143–161.

SAE Paper No. 920046, Effects of High–Boost Turbocharging on Combustion Characteristics and Improving its Low Engine Speed Torque, Sugihara et al., pp. 1–8, 1992.*

* cited by examiner

□ 1750 FULL LOAD
○ 1600 FULL LOAD
△ 1400 FULL LOAD
▽ 1200 FULL LOAD
↑ 1020 FULL LOAD

OPTIMIZED LAMBDA AND COMPRESSION TEMPERATURE CONTROL FOR COMPRESSION IGNITION ENGINES

BACKGROUND OF THE INVENTION

1. Field of the Invention

The invention relates to the control of internal combustion engines and, more particularly, relates to a method and apparatus for optimizing the excess air ratio (lambda), air charge temperature (ACT), and/or compression temperature of a compression ignition internal combustion engine.

2. Discussion of the Related Art

It is well known that the relative proportion of fuel and air has a marked effect on the combustion process in any internal combustion engine. An engine operating on less than a stoichiometric air/fuel ratio will emit unacceptable levels of unburnt fuel and related emissions. It is for this reason that many engines incorporate measures to supply at least as much air to the engine as is required for stoichiometric combustion. The proportion of air in excess of that required for stoichiometric combustion is known as the excess air ratio or "lambda", which is defined as the ratio of total air available for combustion to that required to burn all of the fuel. It is well known that, if lambda drops below a minimum threshold, oxides of nitrogen ($NO_x$) and other emissions increase to unacceptable levels.

Current emissions-regulated, gasoline-fueled Otto cycle (spark ignited) engines invariably use full time lambda control. These engines typically use a catalytic converter having a three way catalyst to reduce emissions. In order to permit the three way catalyst to perform in spark ignition engines, lambda is controlled to a value of 1.00 by use of an exhaust oxygen sensor, usually in a closed loop control mode to hold lambda as close to unity (i.e., one or a stoichiometric ratio) as is practical.

It has also been recognized that at least limited lambda control is important in the operation of unthrottled gas-fueled engines. For instance, U.S. Pat. No. 5,553,575 to Beck et al. (the Beck '575 patent) proposes lambda control by skip fire in an unthrottled gas fueled engine with the number of cylinders skipped being calculated to optimize as much as possible lambda under prevailing engine operating conditions. Optimum lambda is calculated experimentally based upon prevailing engine operating parameters including mean effective pressure (MEP), air charge temperature (ACT), intake manifold absolute pressure (MAP), gas fuel charge quantity, ignition timing, exhaust back pressure (EBP), etc. The number of cylinders to be skipped to obtain this lambda then is calculated. That number of cylinders then is skipped in the next combustion cycle. Lambda then is "fine tuned" by varying manifold absolute pressure (MAP). However, skip fire is considered to be the primary mode of control when less than all cylinders are firing.

The Beck '575 patent states that lambda control is considered unnecessary in diesel engines because diesel engines have "an extremely broad range of useful lambdas." The comments in the Beck '575 patent are typical of traditional thinking with respect to diesel engines. For diesel and other compression ignition engines, it is generally assumed that, so long as lambda is high enough, no other adjustment is required. In fact, for compression ignition diesel engines with modern electronic controls, the value of lambda seldom appears in the calibration tables, let alone in a closed loop control strategy. Even those who have recognized some of the benefits of lambda control have failed to recognize the benefits of full time, full range lambda optimization. Hence, while it recently has been recognized that the performance of compression ignition engines can be enhanced by increasing lambda, there is no suggestion in the art to modulate lambda to avoid exceeding an upper limit of lambda.

For instance, SAE Technical Paper 930272 by Hino Motors, Ltd. (the Hino '272 paper) and SAE Technical Paper 931867 by Hino Motors, Ltd. (the Hino '867 paper) recognize that smoke (BSU) emissions and brake specific fuel consumption (BSFC) decrease as lambda increases. Specifically, the Hino '867 paper reported that, as the boost supplied by the turbocharger of a turbocharged diesel engine was increased to increase lambda from 1.6 to 2.2, both BSU and BSFC dropped substantially at a given $NO_x$ emission level. Reduction of BSU with increased lambda and constant $NO_x$ is reflected by the curves 22, 24, 26, and 28 in FIG. 1. Reduction of BSFC with increased lambda and constant $NO_x$ is reflected by the curves 30, 32, 34, and 36 in FIG. 2. The Hino '272 paper reported significant decreases in ignition delay and combustion duration with increased turbocharger boost and consequent increase in lambda. The implicit conclusion reached by both papers was that optimal operation always results from increasing turbocharger boost as much as feasible so as to increase lambda to a maximum practical level. Neither paper recognized that lambda could be too high or that there might be an optimum lambda for a particular engine operating condition that is less than the maximum available lambda, and neither paper sought to modulate a turbocharger or other engine component to optimize lambda on a full time, full-range basis. Nor did either paper discuss the effects of ACT on the operation of a compression ignition engine or the interaction between lambda and ACT.

The effects of lambda variation on a compression ignition engine also were investigated by SAE Technical Paper 870296 to Arnold (the Arnold paper). The Arnold paper discusses the effects of the control of a variable power turbine (VPT) on the performance of a diesel engine. Arnold's experiments began with the mapping of altered boost levels across the engine's speed and load ranges. An array of speed and fuel flows were chosen that covered the lug line from idle to rated speed and also covered loads ranging from ¼ load to full load from the idle speed to the rated speed. The results of these experiments are summarized in FIG. 3 which illustrates a plot of BSFC against air-fuel ratio at full load. The curves 40, 42, 44, 46, and 48 plot the results at 1750 rpm, 1600 rpm, 1400 rpm, 1200 rpm, and 1020 rpm, respectively. Arnold noted that all of these curves flatten out or reduce slope in roughly the same air-fuel ratio range of 26.5:1 to 31:1.

Arnold concluded that, very much like a gasoline engine, a diesel engine prefers a constant air-fuel ratio and that, while this optimum value varies considerably based on a particular engine design, it usually falls between 26.5:1 and 31:1. Arnold failed to carry his experiments one step further and therefore did not appreciate that deleterious effects occur under some operating conditions if lambda increases above a threshold value. Hence, while the Arnold paper, like the Hino papers, recognized that increasing lambda to something in excess of stoichiometric ratios is desirable during operation of a diesel engine, it failed to recognize that optimum lambda varies with prevailing engine operating parameters including engine speed and that a given air supply system therefore could sometimes supply too much air to the engine under what otherwise might be considered an "optimum" setting. Arnold also failed to address the effects of ACT on engine performance as well as the interplay between ACT and lambda.

Therefore, even in systems such as those disclosed by Hino '867, Hino '272, and Arnold which seek to adjust air supply to enhance engine performance, the air supply typically is adjusted only to be high enough to prevent excessive smoke and BSFC. These and others who have addressed the issue of lambda control failed to recognize that, if lambda rises above a maximum acceptable threshold, incomplete combustion can occur, resulting in excessive unwanted emissions and decreased thermal efficiency. Thus, the search for a truly optimum value of lambda over the entire operating range of the engine has been largely ignored until now. The inventors have recognized that it is essential for optimum control of combustion in an internal combustion engine to maintain lambda values within a permissible range, and preferably to cause lambda values to be adjusted to optimum levels.

ACT control for optimizing engine performance has similarly been ignored or at least underrated. Control of ACT had previously been directed largely to reducing the high temperature emanating from the turbocharger compressor by means of an intercooler. Little attention was given to the possible beneficial effects of decreasing ACT below ambient temperature or of increasing ACT above ambient temperature under certain operating conditions such as light load and/or low ambient temperatures. Conventional diesel engines therefore typically operate at higher than optimum ACT and lower than optimum lambda when at high load and at higher than optimum lambda and lower than optimum ACT when at light load. Consequently, diesel engines have rarely if ever been operated at truly optimum lambda or optimum ACT over the entire engine operating range. In fact, it would be only accidental if the conventional diesel engine were to operate at optimum lambda or optimum ACT values at any operating point in the engine's load/speed ranges.

Some concerted effort will be required to meet future emission regulations for diesel engines, such as EPA 2004 proposed by the United States Environmental Protection Agency. Some of the previously-proposed techniques include 1) exhaust gas recirculation (EGR), 2) particulate traps and, 3) special fuels and fuel additives. All of these techniques are both complex and costly. In addition, all of these techniques are directed more at correcting the deficiency (inadequate lambda control) rather than preventing the deficiency from occurring in the first place. It is not yet appreciated that a combination of full time, full range lambda control, improved fuel injection, and improved combustion temperature control through ACT control has the potential to obviate the need for these additional corrective techniques. Even if some of these corrective techniques are used, it appears logical that the optimization of lambda and ACT should be accomplished prior to the addition of some of these more severe techniques.

OBJECTS AND SUMMARY OF THE INVENTION

A principal object of the invention is to optimize the performance of a compression ignition internal combustion engine by the full time, full range control of the excess air/fuel ratio (lambda) and/or air charge temperature (ACT) to selected optimum values. This object may be achieved through the closed loop control of one or more components of the engine's air supply system including a turbocharger, a series supercharger, a turbo air bypass valve, an intercooler assembly, and/or a turboexpander.

The closed loop control preferably is accomplished by 1) determining the actual air flow, per cylinder and per cycle, 2) determining the ratio of actual airflow to commanded fuel flow to obtain the actual value as lambda, and then 3) comparing the actual value of lambda to a desired preselected optimum value of lambda to obtain an error signal. The error signal can then be used in a closed loop strategy to adjust the performance of an engine component such as a series supercharger to modulate the engine's intake manifold absolute pressure (MAP). The error signal can also be used to adjust air charge temperature (ACT) and/or turbo air bypass (TAB). During steady-state operation, optimum lambda can usually be achieved by closed loop control of MAP and ACT alone. During transient operation (i.e., a sudden and significant change in commanded power), MAP and/or ACT control can be supplemented if necessary by temporarily adjusting the fuel flow to be different from the commanded fuel flow in order to maintain operation at or near optimum lambda during transient conditions by matching actual fuel flow to the prevailing actual airflow. The components used to control optimum lambda can also be used to adjust ACT and the resultant compression temperature which in turn affects the combustion characteristics of a compression ignition engine. Modulation of ACT and MAP therefore permits simultaneous optimiation of both lambda and compression temperature.

Still another tool for optimizing engine operation and performance is the use of electronically controlled intake and exhaust valves. Controlled intake and exhaust valves can be used in conjunction with optimum lambda and optimum ACT to further enhance engine operation. Early or late closing of the intake valves reduces the effective compression ratio and therefore has the same effect on compression temperature as a reduction in ACT. The valves can also be used to effect selective skip fire of both fuel and air with resultant benefits.

Other objects, features and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

1. Résumé

Pursuant to the invention, the performance of a compression ignition internal combustion engine is improved by optimizing excess air ratio (lambda) and/or intake air charge temperature (ACT) on a full time, full range basis. The basic procedure is to first determine the desired or optimum lambda and then to control ACT and intake manifold absolute pressure (MAP) to maintain them at the optimum values for the fuel quantity required at a particular operating point. This approach allows control of both temperature and pressure of the air entering the engine. Full range control requires that lambda and ACT be controlled both upward and downward to achieve optimal engine performance. Control of both lambda and ACT is facilitated through the use of a supercharger installed in series with a standard turbocharger compressor of the engine. Supercharger control may, if desired, be supplemented with turbo air bypass (TAB) control, turboexpander control, and intake and exhaust valve control including skip fire of both fuel and air. The essence of optimized lambda control is to measure the physical properties of the working fluid in the intake manifold, exhaust manifold, or both, compute the actual value of lambda, and compare that actual value with an optimum value for the prevailing engine operating conditions. This comparison yields an error signal which is then used to control the magnitude of the required adjustment in MAP, ACT or other engine operating parameter.

2. System Overview

The invention is applicable to virtually any compression ignition engine including dual fuel and other gaseous fueled engine as well as traditional diesel engines. The invention is particularly well-suited for use with a turbocharged diesel engine having a supercharger in series with the turbocharger compressor. The series supercharger can be used to increase or augment the manifold absolute pressure (MAP) and hence the air supply to the engine beyond that which would otherwise be available from the turbocharger. The addition of a series supercharger also facilitates the use of a tuboexpander to reduce air charge temperature (ACT) when desired. A supercharger therefore can be selectively controlled, in combination with the downstream turbocharger, to vary the air supply to the engine's intake manifold to virtually any desired level. A series supercharger for turbocharger augmentation is disclosed, for example, in U.S. Pat. No. 5,471,965 to Kapich, the subject matter of which hereby is incorporated by reference in its entirety.

Figure 1:
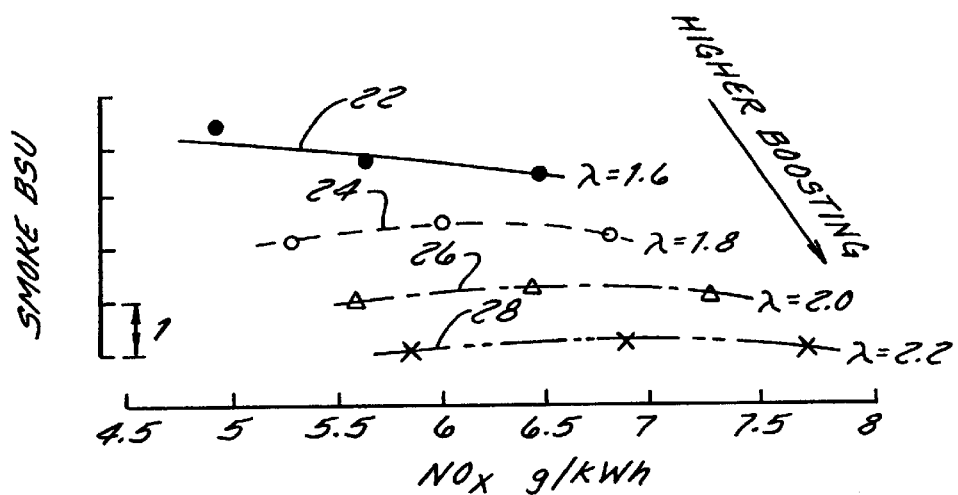
FIG. 1 is a graph of smoke (BSU) versus $NO_x$ at various lambda settings, labelled "Prior Art"
Figure 2:
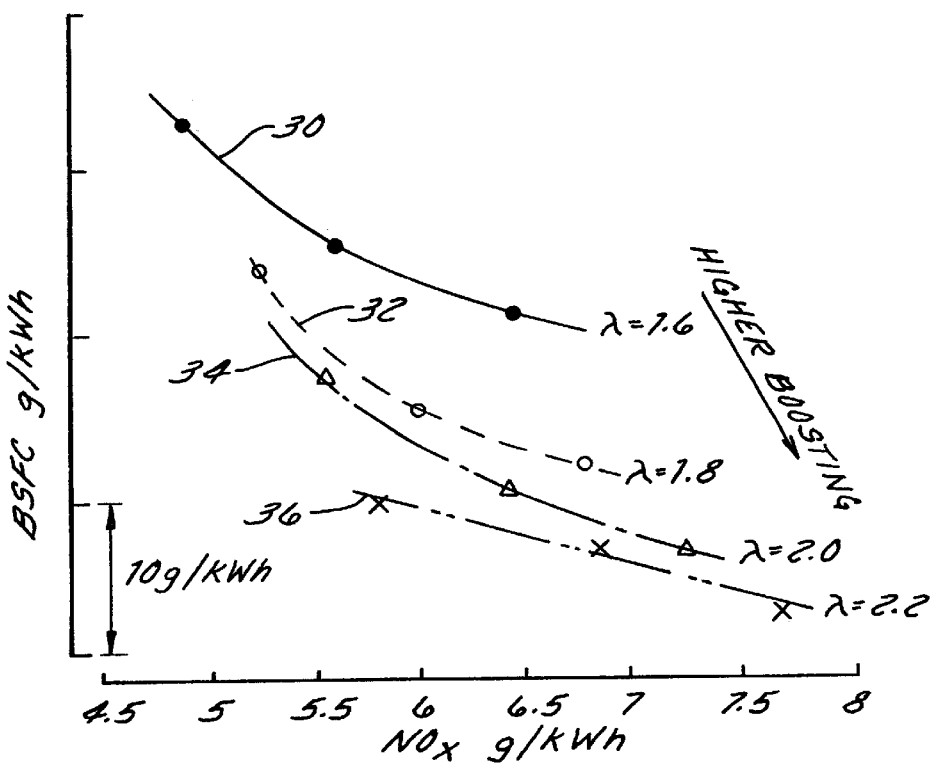
FIG. 2 is a graph of BSFC versus $NO_x$ at various lambda settings, labelled "Prior Art"
Figure 3:
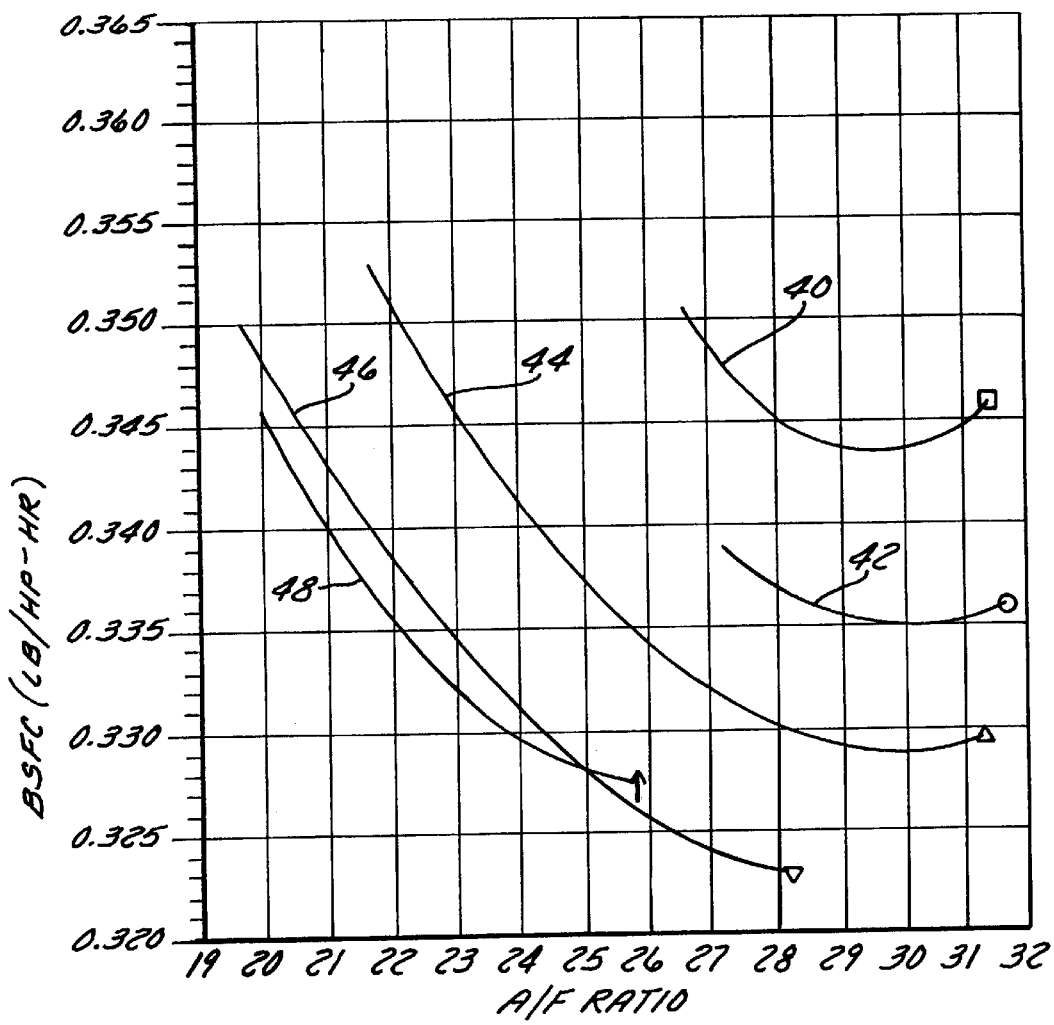
FIG. 3 is a graph of BSFC versus air/fuel ratio (lambda) at various engine speeds at full load, labelled "Prior Art"
Figure 4:
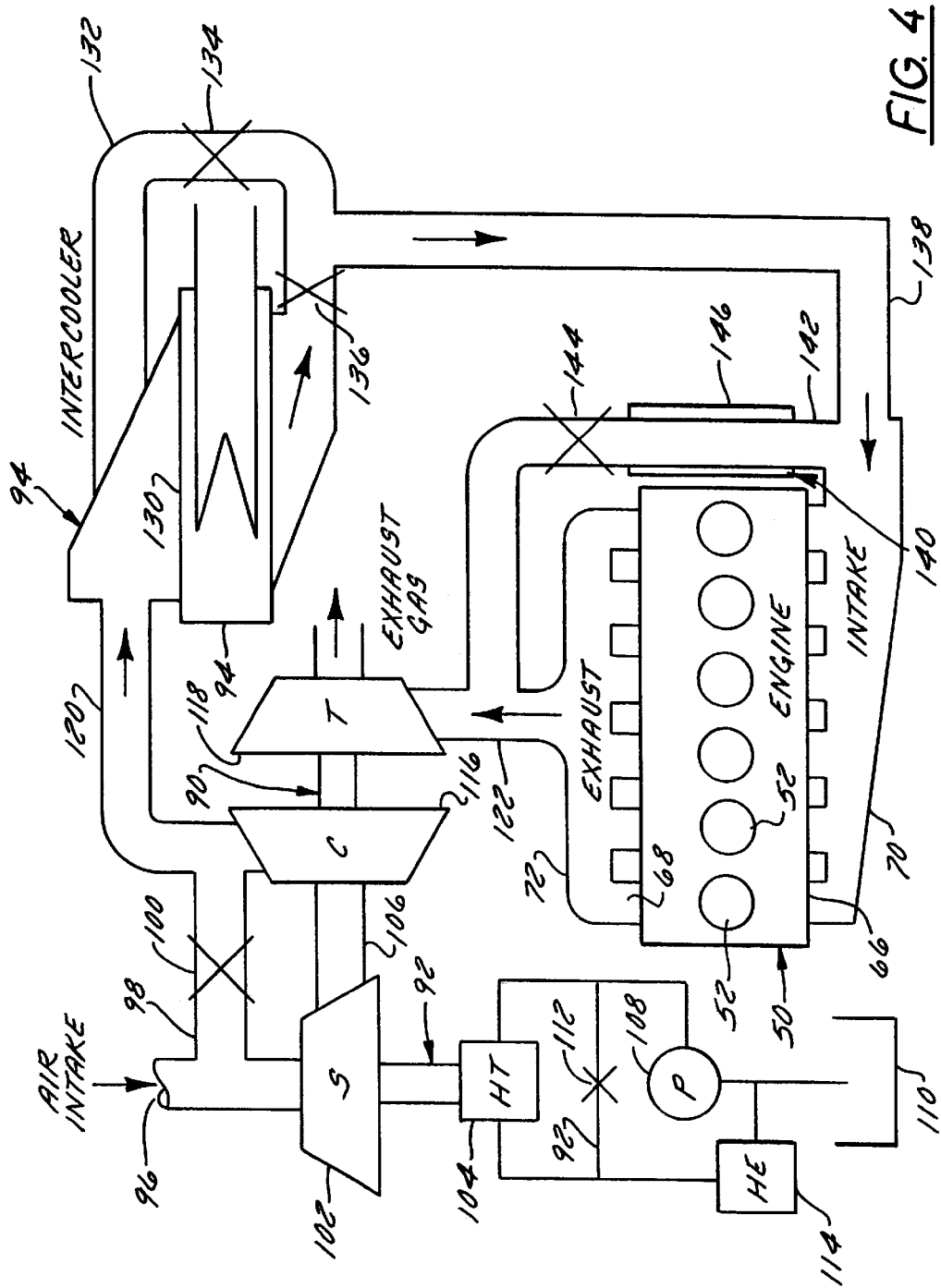
FIG. 4 is a schematic representation of an air supply system of a diesel engine constructed in accordance with a first preferred embodiment of the invention.
Figure 5:
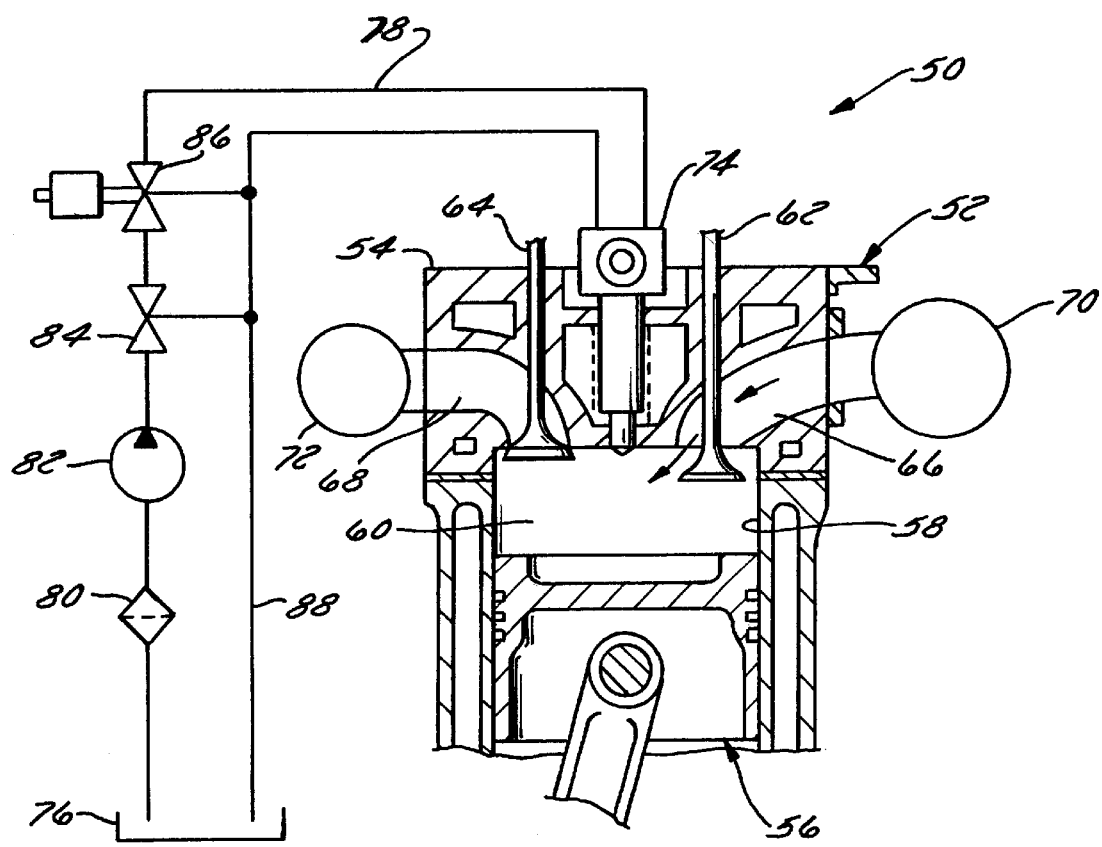
FIG. 5 is a partially schematic sectional elevation view of a cylinder of the engine of FIG. 4.

Referring now to FIGS. 4 and 5, a diesel engine 50 is schematically illustrated with which the present invention is applicable. Engine 50 includes a plurality of cylinders 52 each capped with a cylinder head 54 (FIG. 5). A piston 56 is slidably disposed in the bore 58 of each cylinder 52 to define a combustion chamber 60 between the cylinder head 54 and the piston 56. The piston 56 is also connected to a crankshaft (not shown) in a conventional manner. Inlet and exhaust valves 62 and 64 are provided at the end of respective intake and exhaust passages 66 and 68 in the cylinder head 54. Air is supplied to the supply passages 66 of all cylinders 52 from a conventional air intake manifold 70. Exhaust products are exhausted from the exhaust passages 68 of all cylinders 52 via an exhaust manifold 72. Valves 62 and 64 may be actuated by a standard camshaft (not shown). However, the preferred valves are camless, electro-hydraulically controlled valves capable of modulating the supply of air to and the exhaust of combustion products from the combustion chamber 60. Various devices for electronically controlling intake and exhaust valves have been designed and demonstrated. Some large diesel engines currently in production utilize hydraulically actuated exhaust valves.

As best seen in FIG. 5, each cylinder 52 is supplied with diesel fuel or another liquid fuel ignitable by compression via an electronically controlled fuel injector 74. Injector 74 preferably takes the form of an electro-hydraulic fuel injector and more preferably a pressure-intensified accumulator-type injector of the type disclosed in reissue U.S. Pat. No. 33,270 to Beck (the Beck '270 patent), the subject matter of which is hereby incorporated by reference. The injector 74 is supplied with diesel fuel or the like from a conventional tank 76 via a supply line or common rail 78. Disposed in line 78 are a filter 80, a pump 82, a high pressure valve 84, and a fuel rail pressure regulator 86. A return line 88 also leads from the injector 74 to the tank 76. As is known in the art and detailed in the Beck '270 patent, the injector 74 and rail pressure regulator 86 can be controlled on a cycle by cycle and cylinder by cylinder basis to adjust fuel injection timing, duration, and quantity.

In the preferred embodiment, optimization of lambda and/or ACT is achieved at least in part through the cylinder by cylinder and cycle by cycle control of airflow to the engine's air intake manifold 70. FIG. 4 illustrates a first embodiment of an air intake system or air supply system suitable for this task. This system includes a turbocharger 90, a series supercharger 92, and an intercooler assembly 94. This system is supplied with air by an air intake line 96. A bypass line 98 bypasses the turbocharger 90 and supercharger 92. A turbo air bypass (TAB) valve 100 is located in the bypass line 98 so that the fraction of incoming air that bypasses the supercharger 92 and turbocharger 90 can be varied as detailed below.

The supercharger 92, which may be any conventional compressor type used but which preferably is of the type disclosed in the Kapich patent, has a compressor 102 and a turbine 104 which drives the compressor 102 to increase the pressure of air flowing through the compressor 102. The compressor 102 has 1) an air inlet connected to a supercharger inlet branch 96 of the air intake line and 2) an air outlet connected to a supercharger discharge line 106. The turbine 104 is driven by a variable flow hydraulic source to control the compressor output. In the illustrated embodiment, the drive device comprises a variable pressure hydraulic drive including a pump 108 receiving hydraulic fluid from a reservoir 110. The pump 108 may be driven by a variable speed, electronically controlled motor or (as in the illustrated embodiment) may have its output varied by operation of an electronically controlled, variable-position control valve 112. In use, pressurized fluid from the pump 108 drives the turbine 104 at a speed determined by the effective outlet pressure of the pump 108, and the turbine 104 in turn drives the compressor 102 to boost the pressure of air flowing through the compressor 102. The effective outlet pressure of the pump 108 is modulated by modulation of the supercharger control valve 112. Hydraulic fluid exiting the turbine 104 is cooled in an oil cooler 114 before returning to the reservoir 110 for reuse by the pump 108.

The disclosed hydraulic drive for the supercharger 92 could be replaced by any suitable electric, pneumatic, or other drive so long as the drive varies the power to the turbine 104 on a demand basis. A mechanical engine-driven device could also conceivably work but would impose high parasitic losses on the engine when supplemental air is not required.

The turbocharger 90 may be any conventional turbocharger of the type used in diesel engines but preferably has a variable nozzle turbine (VNT) of the type disclosed in Rochford et al., "A Next Generation Variable Turbine Geometry Turbocharger for Highly Rated Diesel Track Engines", Paper No. 34, Eighth International Pacific Conference of Automotive Engineering, Nov. 4–9, 1995. The turbocharger 90 includes a compressor 116 and a turbine 118 which drives the compressor 116. The compressor 116 has an air inlet connected to the supercharger discharge line 106 and an air outlet connected to an intercooler feed line 120. The turbine 118 has an inlet connected to an exhaust line 122 and an outlet connected to the atmosphere. As is conventional in the art, exhaust gases flowing through the turbine 118 drive the compressor 116 so that the pressure of air entering the compressor inlet from the line 106, having been pre-boosted to an extent by the supercharger 92, is boosted additionally before being discharged into the intercooler feed line 120.

The purpose of the TAB valve 100 is to modulate turbocharger compressor outlet pressure The illustrated valve 100 is an electronically controlled, variable position valve that can be set to adjust the quantity of airflow that recirculates back to the air intake line 96 in order to reduce MAP. This valve could, if desired, be supplemented with or replaced by a variable nozzle turbine (VNT) or by a conventional waste gate that permits partial or complete bypass of the turbocharger's turbine 118 by exhaust gases flowing through the exhaust line 122. In addition, the power supplied to the series supercharger 92 typically will be reduced as a first adjustment to reduce MAP. In addition, an EGR pump, similar in design and operation to the hydraulic supercharger, may be used in lieu of an EBP valve.

It can thus be seen that the pressure in the line 120 (and hence the MAP) will depend upon 1) the setting of the supercharger control valve 112 and the corresponding inlet air pressure modulation by adjusting the area of the variable nozzle turbine, VNT, the turbocharger 90 and 2) the setting of the TAB valve 100 and/or the VNT.

The purpose of the intercooler assembly 94 is to permit selective reduction of the air charge temperature (ACT). The assembly 94, which has an inlet connected to the intercooler feed line 120 and an outlet connected to a feed line 138 for the air intake manifold 70, includes a conventional intercooler 130 (i.e., an air-to-air heat exchanger that exchanges heat with the ambient air to cool intake air flowing therethrough) located in parallel with an intercooler bypass line 132. An intercooler bypass valve 134 is disposed in the intercooler bypass line 132, and an intercooler control valve 136 may, if desired, be disposed at the exit of the intercooler 130. The valves 134 and 136 are electronically actuated valves operated inversely with respect to one another to cause the fraction of supply air bypassing the intercooler 130 to vary from 0 to 100 with consequent increase of ACT. ACT can be increased further by turbocharger control and supercharger control. For example, use of maximum supercharger input power with supercharger air bypassed back to the inlet 96 and both the supercharger 92 and the turbocharger 90 fully bypassed will result in maximum increase in ACT. This procedure can be particularly useful for cold start and idle conditions.

Although not essential or perhaps even desirable to the operation of the present invention, an exhaust gas recirculation (EGR) subassembly 140 may be provided to supplement the effects of lambda control and ACT control. The EGR subassembly 140 includes an EGR line 142 leading from a branch of the exhaust line 122 and to the air intake manifold feed line 138. Disposed in the EGR line 142 are an EGR valve 144 and an EGR cooler assembly 146. The EGR valve 144 is an electronically controlled, variable position metering valve. The percentage of the total available EGR gases flowing into the intake manifold 70 may vary from 0 to 100% depending upon the setting of the EGR valve 144. However, normal EGR values rarely exceed 50%. In addition, an exhaust back pressure (EBP) valve (not shown) having an adjustable flow-restricting metering orifice may be provided in the exhaust gas stream to control the exhaust gas absolute pressure (EGAP) in order to force EGR to flow against the prevailing MAP.

Figure 6:
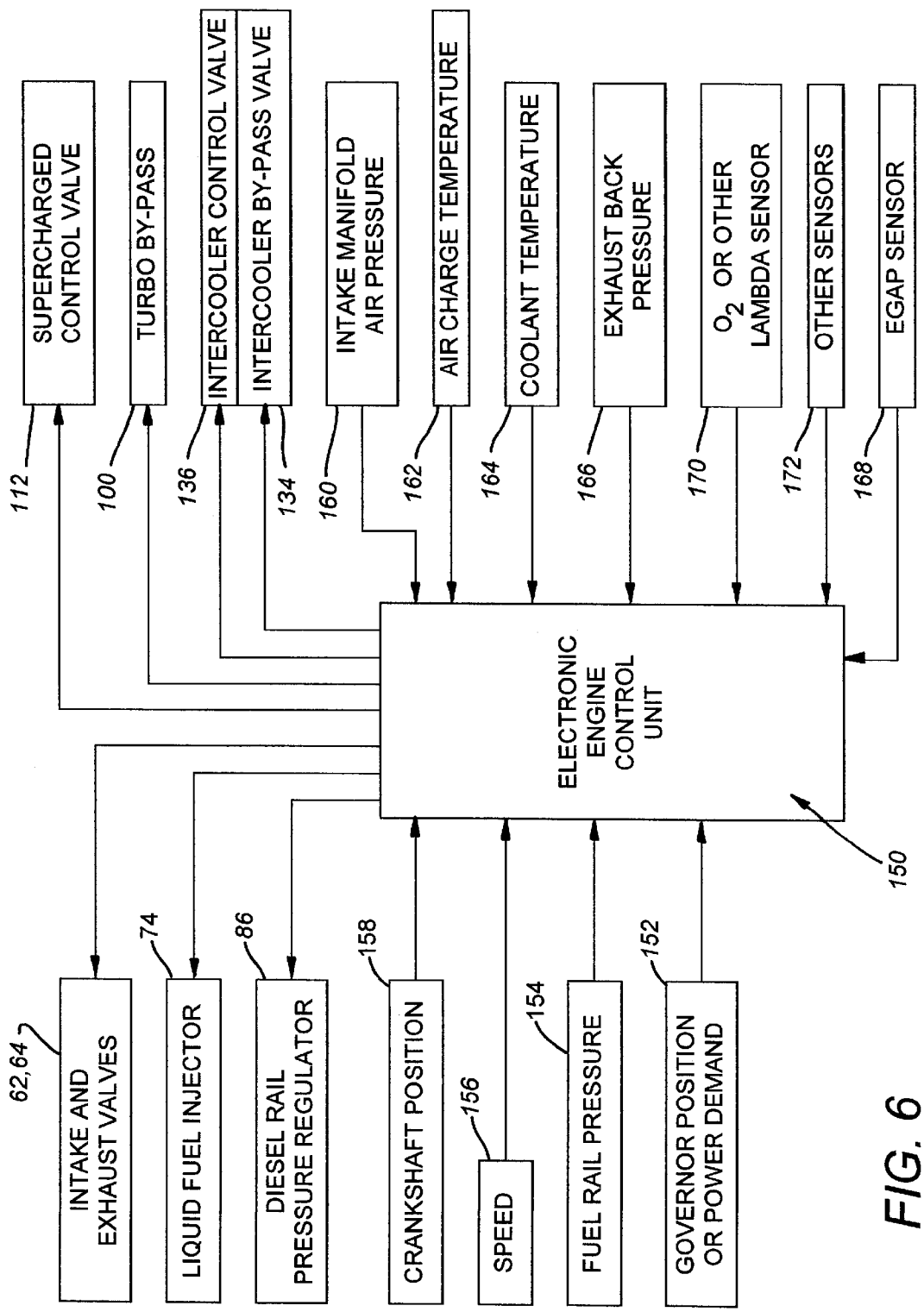
FIG. 6 is a schematic view of the sensors and electronic controls of the engine of FIGS. 4 and 5.

The supercharger control valve 112, TAB valve 100, intercooler bypass valve 134, intercooler control valve 136, EGR valve 144, and other electronically-controlled engine components are controlled by operation of a conventional programmed electronic control unit (ECU) 150 represented schematically in FIG. 6. The ECU 150 may comprise any electronic device capable of monitoring engine operation and of controlling the supply of fuel and air to the engine 50. In the illustrated embodiment, ECU 150 comprises a programmable digital microprocessor. The ECU 150 receives signals from various sensors including a governor position or other power command sensor 152, a fuel rail pressure sensor 154, an engine speed (rpm) sensor 156, a crankshaft position sensor 158, an intake manifold absolute pressure (MAP) sensor 160, an intake manifold air charge temperature (ACT) sensor 162, an engine coolant temperature sensor 164, an EBP sensor 166, and an EGAP sensor 168.

ECU 150 also ascertains actual lambda on a cylinder by cylinder and cycle by cycle basis. Lambda may be ascertained mathematically from a calibrated fuel flow together with a determination of air flow using a speed density calculation using input from one or more of the sensors, 152–168 and/or may be measured somewhat more directly using a lambda sensor 170. This sensor 170, if provided, may for instance comprise a sensor which measures oxygen concentration in the exhaust stream of the associated cylinder 52 and which can be used to calculate the value of lambda by use of a calibration table which correlates oxygen concentration with excess air ratio at the commanded fuel flow into the cylinder 52. Alternatively, the sensor 170 could comprise a mass flow sensor which determines the mass flow of air and fuel into the engine 50.

The ECU 150 manipulates data from sensors 152–170, as well as data from any other required sensors as represented collectively by block 172 in FIG. 6, and transmits output signals for controlling the flow of fuel and air to the engine 50 on a cycle by cycle and cylinder by cylinder basis. Fuel supply is controlled by the electronic control of the rail pressure regulator 86 and the individual fuel injectors 74. Air supply is controlled by the control of the TAB valve 100, the supercharger control valve 112, the turbocharger VNT, the intercooler control valve 136 (if present), and the intercooler bypass valve 134. If the intake and exhaust valves 62 and 64 are electronically controlled, both fuel supply and air supply also can be modulated by suitable control of these valves.

Pursuant to the invention, the controller or ECU 150 1) receives the signals from the various sensors 152–172, 2) performs calculations based upon these signals to determine optimum lambda, ACT, and possibly other engine operating parameters under prevailing engine operating conditions, and 3) controls the supply of both air and fuel to the engine 50 so as to optimize these values on a cycle by cycle and cylinder by cylinder basis—preferably in a closed loop and on a full time, full range basis. Possible control schemes now will be detailed.

3. Basic Lambda Control Scheme

At the core of the invention is the full time, full range control of lambda so as to maintain a selected engine performance characteristic (such as a trade-off between emissions and fuel economy) on a cylinder by cylinder and cycle by cycle basis at a desired optimum value under prevailing engine operating conditions. Combustion temperature also is preferably varied, preferably by controlling ACT (possibly aided by intake and exhaust valve control) and even more preferably in combination with lambda control. Skip fire may also be used to make coarse adjustments in lambda followed by modulation of MAP and ACT to fine-tune engine control.

Preferably, lambda is adjusted primarily by modulating MAP through suitable adjustment of the supercharger control valve 112 and/or the TAB valve 100. Pressure modulation is preferred (at least as part of lambda control) because 1) it does not require highly specialized equipment and 2) it also permits control of the air charge density. Air charge density modulation is desirable because fuel penetration is inversely proportional to air charge density. If MAP and the resultant air charge density are less than optimal, the spray penetration can be too high (resulting in wall wetting) or too low (resulting in incomplete mixing).

In addition to being adjusted by modulation of MAP, lambda can also be adjusted by modulation of ACT. ACT modulation and the resultant compression temperature modulation also have independent benefits detailed in Section 4 below.

A preferred process for lambda optimization by MAP modulation now will be detailed on the assumption that the process is performed automatically by the ECU 150, it being understood that the process could also be performed automatically or semi-automatically by other means.

The lambda control is accomplished by 1) combining signals from sensors 160, 162, 168, 170, etc. to determine the actual value of lambda by determining the actual airflow and the ratio of actual airflow to commanded fuel flow, and then 2) comparing the actual value of lambda to the predetermined desired or optimum value of lambda. The error signal between actual lambda and desired optimum lambda then can be used in a closed loop strategy to control operation of the supercharger control valve 112, the TAB valve 100, and the valves 134 and 136 controlling airflow to the intercooler assembly 94 to raise or lower lambda a required.

During transient operation, the fuel flow can be temporarily adjusted (by control of the injectors 74 and/or the rail pressure regulator 86) to be different from the commanded fuel flow in order to maintain operation at optimum lambda during transient conditions by matching actual fuel flow to the prevailing actual airflow. During steady-state operation, optimum lambda can usually be achieved by closed loop control of MAP and ACT.

Figure 11:
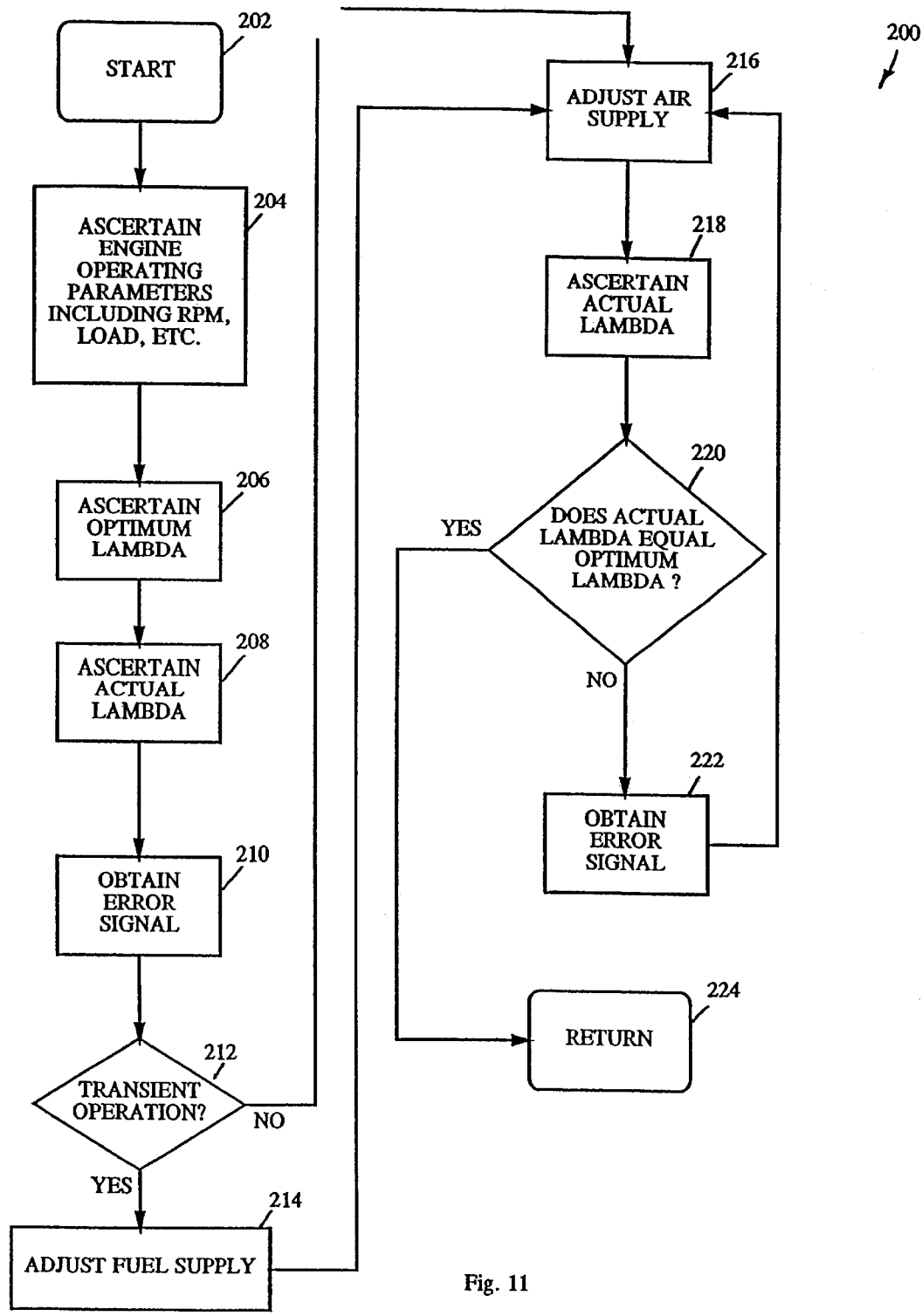
FIG. 11 is a flow chart of a closed loop, full range, and full time control scheme for the optimization of lambda in accordance with the invention.
Figure 13A:
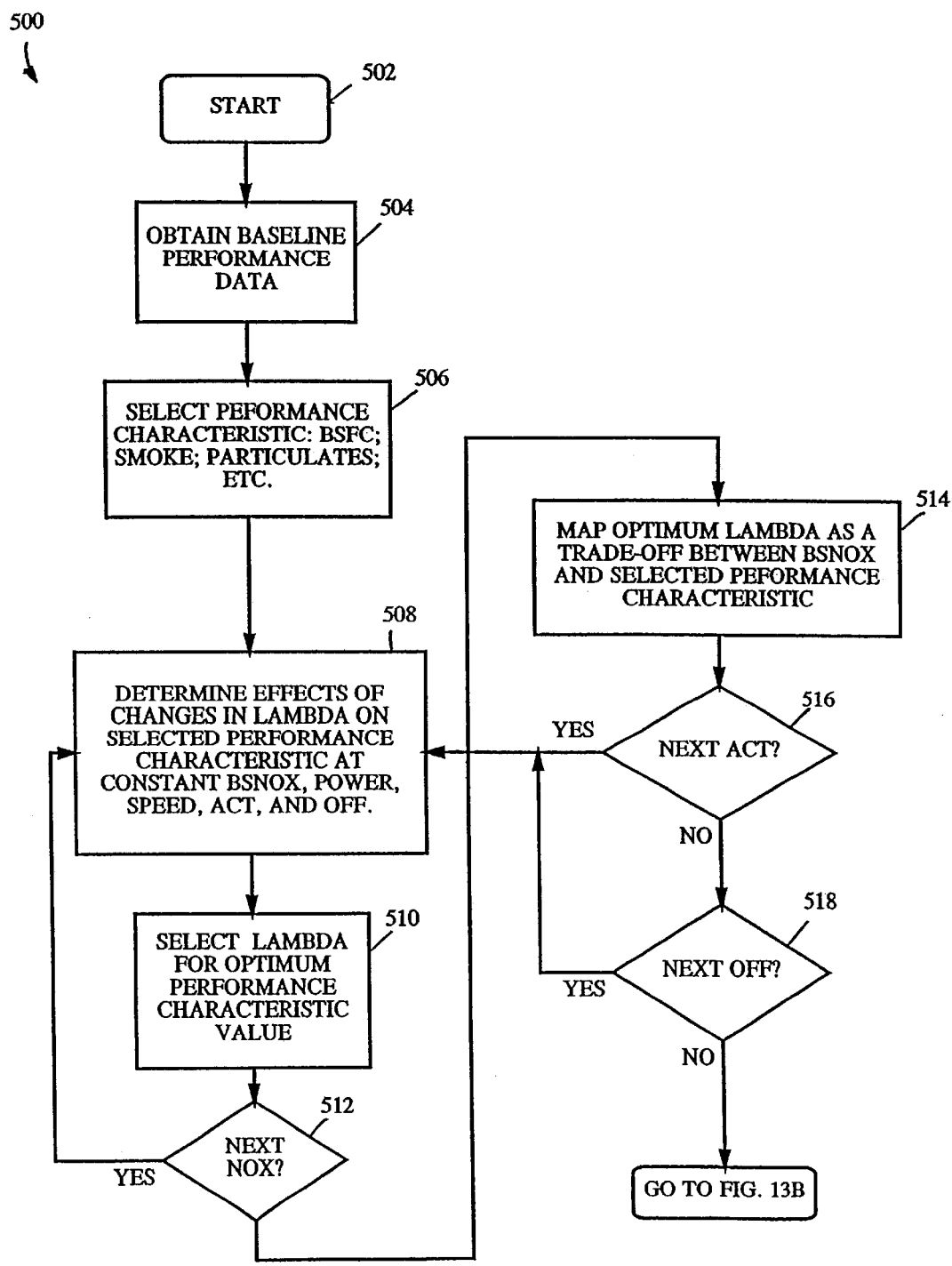
FIGS. 13A–13C collectively form a flow chart of a scheme for determining optimum lambda, ACT, and skipped cylinders in accordance with the invention.
Figure 13B:
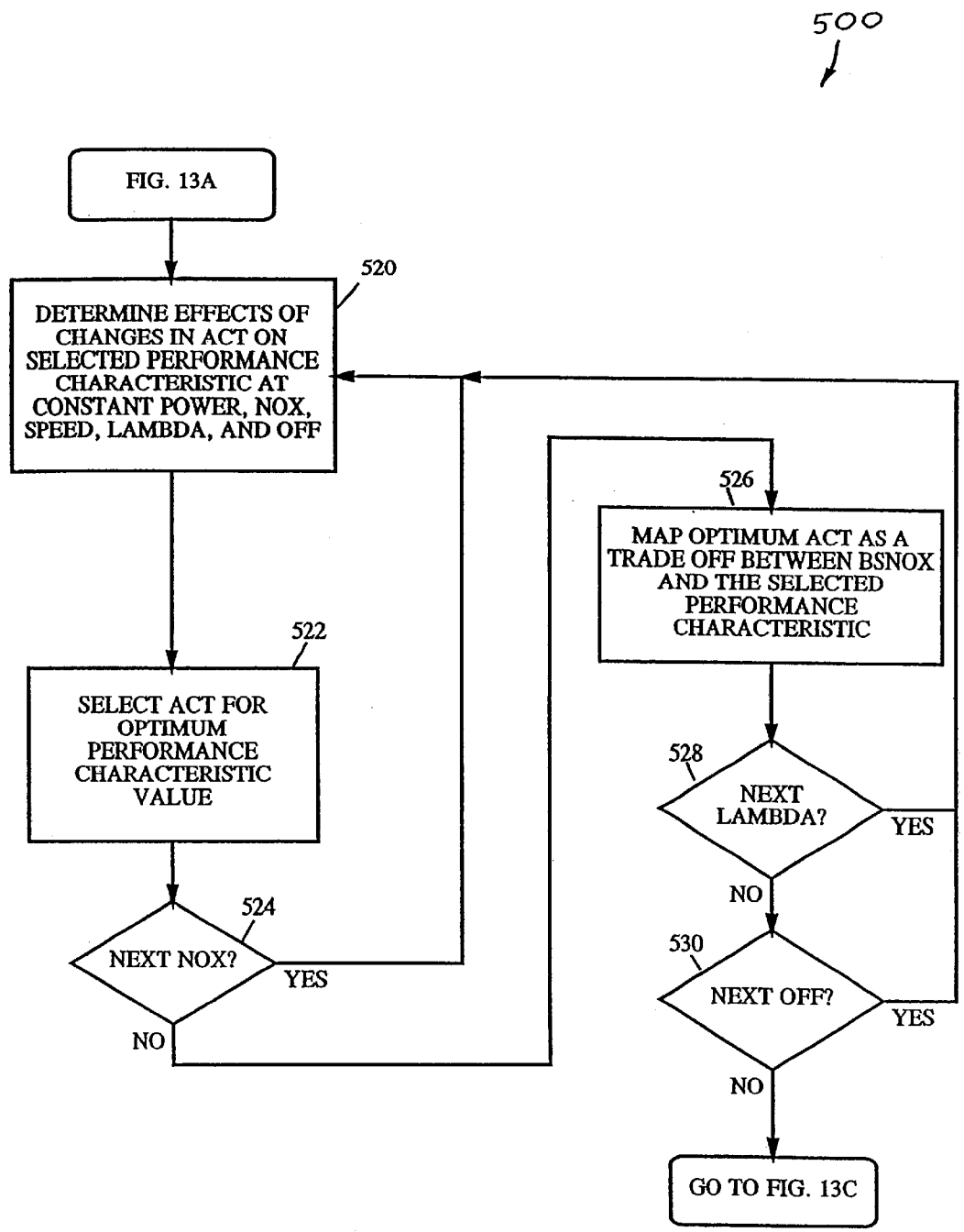
Figure 13C:
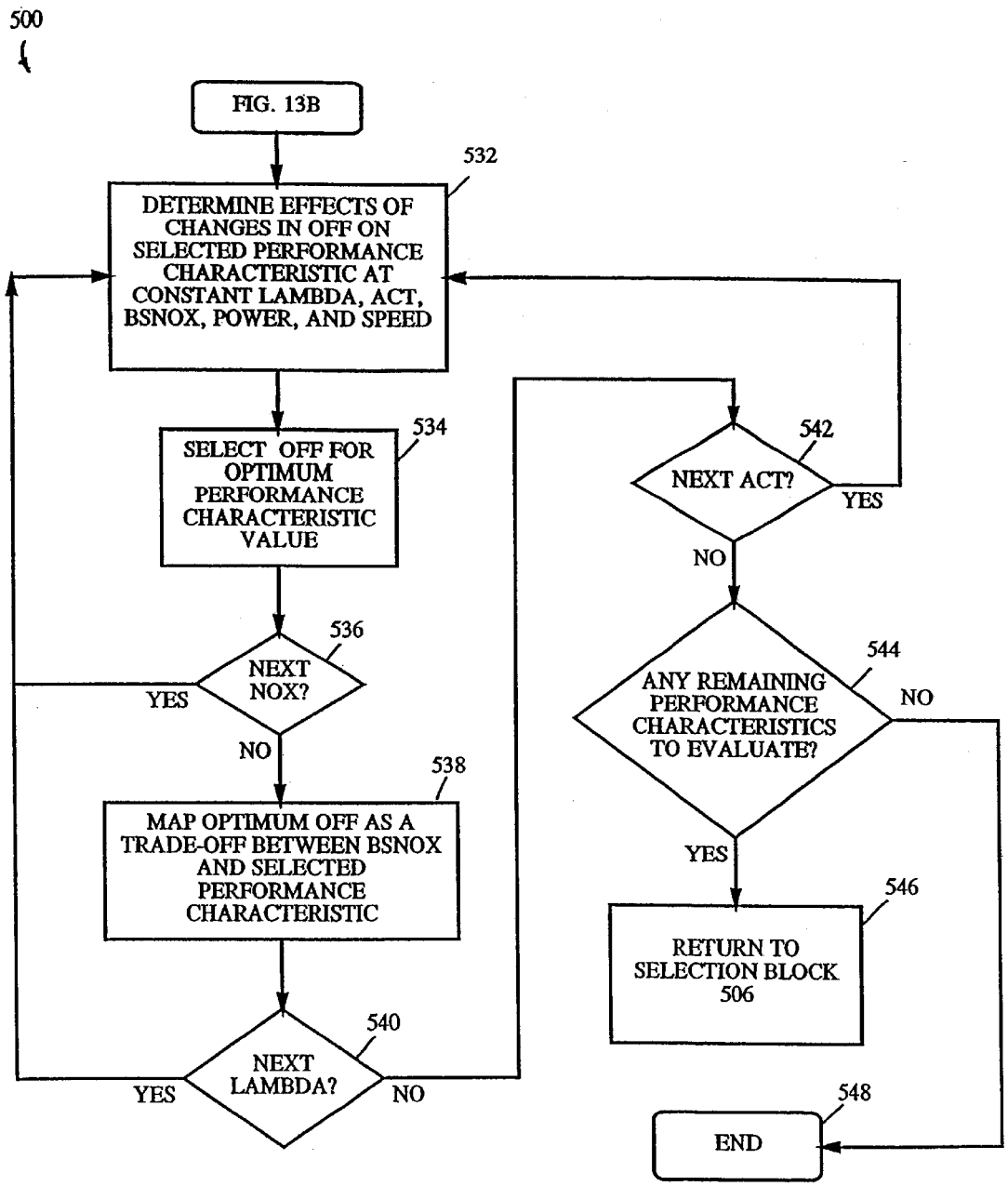

Referring to FIG. 11, a routine 200 preprogrammed in the ECU 150 for these purposes proceeds from start in block 202 to block 204 where current engine operating conditions are ascertained using signals from the sensors 152–172. These operating conditions will include engine speed, engine load, lambda, ACT, the number of cylinders firing, etc. The optimum lambda ($\lambda_{OPT}$) for the prevailing engine operating conditions then will be ascertained in step 206, preferably by reading $\lambda_{OPT}$ from a map stored in the memory of the ECU 150. This map typically will store the value of $\lambda_{OPT}$ at a particular engine speed/load condition. The optimum value of lambda will vary from application to application, depending upon the engine performance characteristics sought to be optimized. Typically, and for the purposes of the present example, $\lambda_{OPT}$ can be considered to be that which strikes the ideal balance between emissions and fuel economy at prevailing rpm, load, ACT, and skip fire conditions. This "ideal balance" may vary depending upon whether the designer is primarily concerned with maximizing fuel economy or with minimizing emissions. The manner in which this map may be generated for a particular engine will be detailed in Section 5 below in conjunction with the discussion of FIGS. 13A–13C.

Next, in step 208, the ECU 150 ascertains the actual value of lambda ($\lambda_{ACT}$), either directly or indirectly, in a manner which is well known to- those skilled in the art, using as input data 1) signals from the sensor 170 and 2) the commanded fuel flow. A substraction of $\lambda_{OPT}$ minus $\lambda_{ACT}$ in block 210 yields an error signal ERR.

A very high ERR will indicate transient engine operation (sudden and sharp increase or decrease in commanded power) that will hinder or even preclude lambda optimization by air charge modulation alone. In order to take this possibility to account, the routine 200 inquires in step 212 whether or not the engine 50 is undergoing transient operation. If so, the ECU 150 will adjust the operation of the fuel injector 74 and/or the rail pressure regulator 86 in block 214 to temporarily reduce or increase the fuel quantity with respect to the commanded quantity by an amount required to attain lambda optimization at the prevailing air charge pressure value. The duration and magnitude of this fuel supply adjustment will vary with the severity of the transient condition and the response time of the air charge control system. Fuel supply adjustment will terminate as soon as the system is capable of optimizing lambda by air supply control alone.

The routine 200 then proceeds to block 216 for air supply adjustment. This adjustment preferably will include at least adjustment of the position of the supercharger control valve 112 and may, depending upon the results sought and the preferences of the programmer, also include adjustment of other parameters of the intake air supply system. The magnitude of adjustment preferably is set to be proportional to the magnitude of the error signal ERR in order to minimize the number of iterations required for lambda optimization. If the error signal ERR is positive, indicating that lambda needs to increase, the ECU 150 preferably will control the air supply system to increase MAP by 1) increasing airflow through the intercooler control valve 136, 2) decreasing or cutting-off airflow through the intercooler bypass valve 134 and the TAB valve 100, and 3) modulating the supercharger control valve 112 to increase the supercharging effect on the inlet air flowing into the turbocharger 90. Conversely, if it is decided in block 210 that the signal ERR is negative and that lambda therefore needs to be decreased, the ECU 150 preferably will control the air supply system to decrease MAP by 1) decreasing or cutting off airflow through the intercooler control valve 136, 2) increasing or permitting airflow through the intercooler bypass valve 134 and the TAB valve 100, and 3) modulating the supercharger control valve 112 to decrease the supercharging effect on the inlet air flowing into the turbocharger 90.

Next, in block 218, the value of actual lambda $\lambda_{ACT}$ is again ascertained, and that actual value is once again compared to the optimum value $\lambda_{OPT}$ in block 220 to determine whether or not $\lambda_{ACT}$ is approximately equal to $\lambda_{OPT}$. If not, the error signal ERR is once again obtained in block 222, and the routine 200 returns to block 216 where the air supply is once again adjusted with the magnitude of adjustment once again being proportional to the magnitude of the error signal. The routine 200 then proceeds through blocks 216, 218, 220, and 222 in a reiterative, closed loop fashion until $\lambda_{ACT}$ is approximately equal to $\lambda_{OPT}$, at which point the routine 200 proceeds to return in a block 224.

Figure 8:
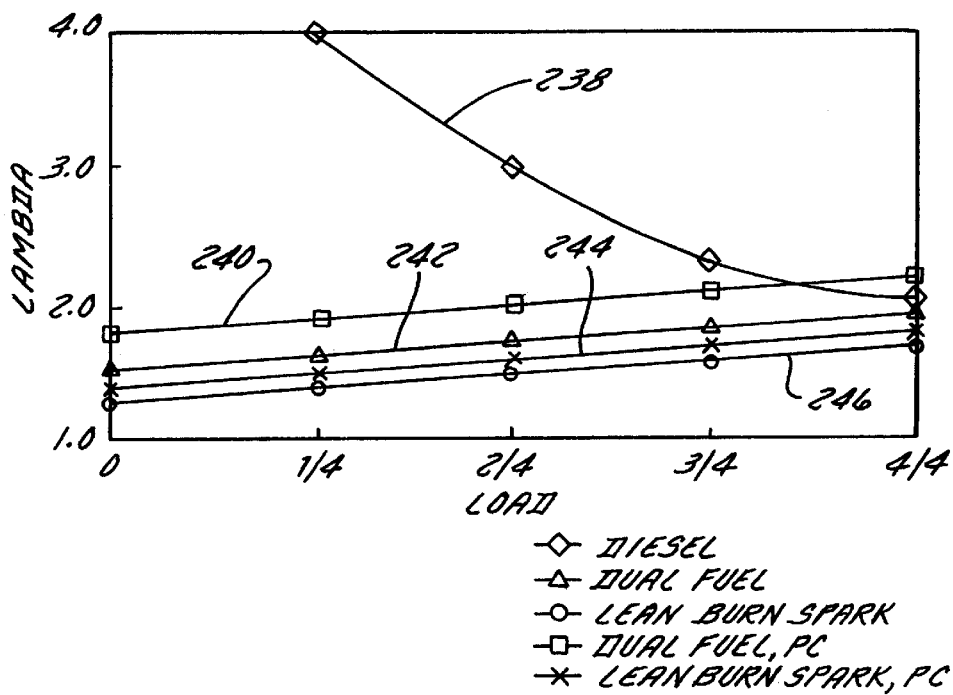
FIG. 8 is a graph of optimum lambda versus engine load for various engines.
Figure 9:
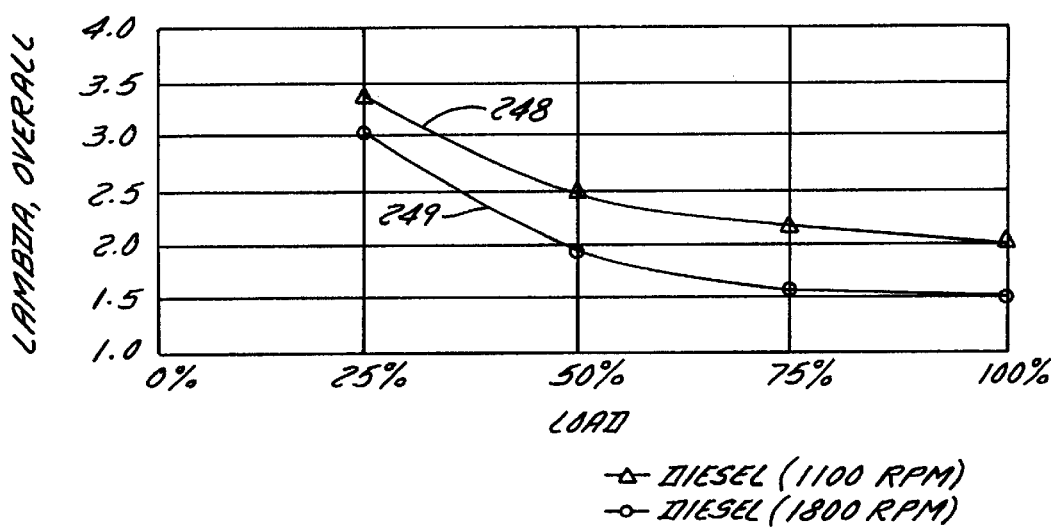
FIG. 9 is a graph of optimum lambda versus engine load at various engine speed settings.

The above-described closed-loop process is repeated, on a cylinder by cylinder and cycle by cycle basis, preferably whenever the engine 50 is operating, throughout the speed and load ranges of the engine 50. This full time and full range control achieves steady-state lambda optimization that heretofore would not have been achieved. The effects of the failure of traditional systems—even those that seek to increase lambda during engine operation—to obtain full time and full range lambda optimization can be appreciated with reference to FIGS. 7–9.

Figure 7:
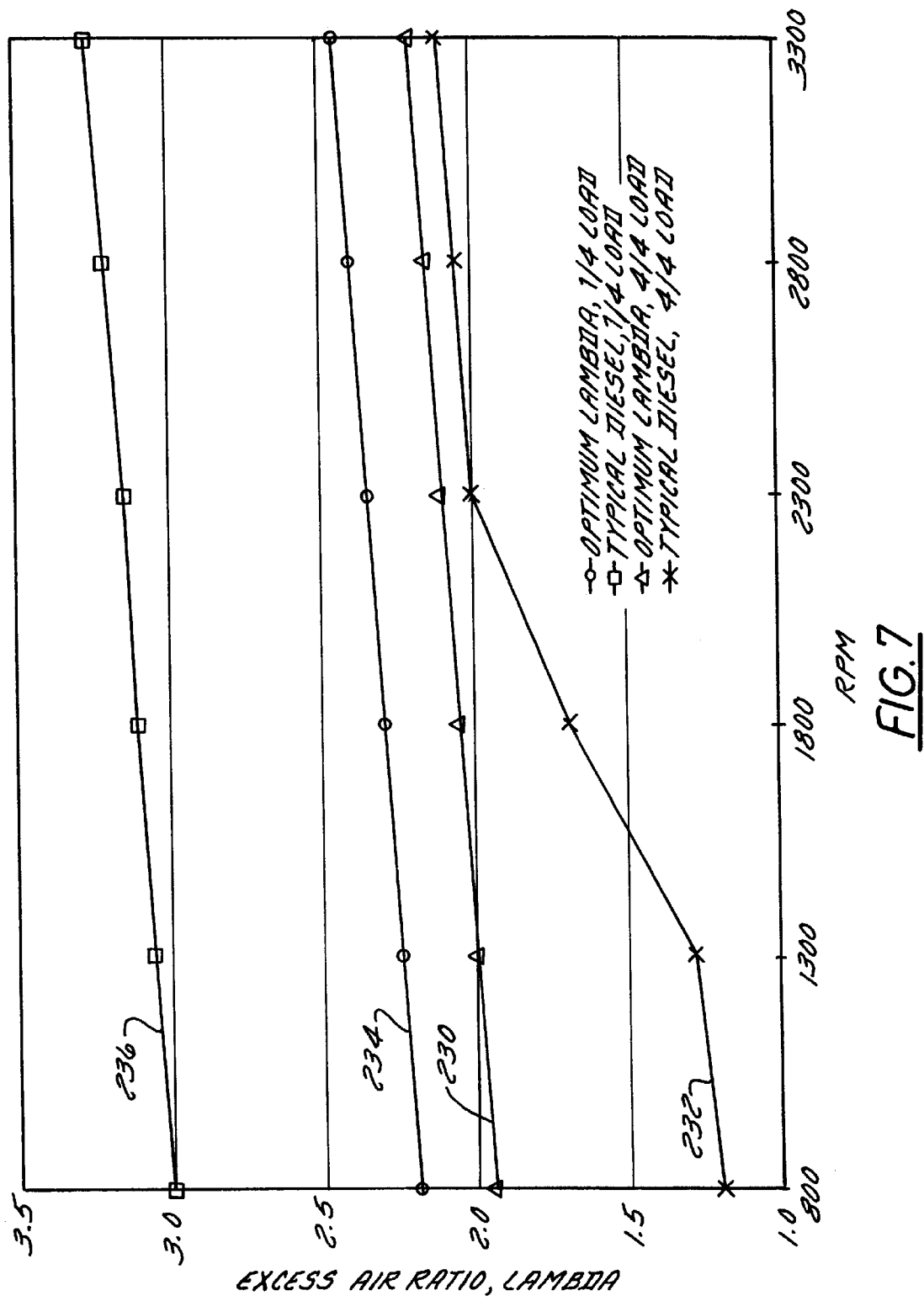
FIG. 7 is a graph of optimum lambda versus rpm at various engine load settings.

For instance, a comparison of the curve 230 to the curve 232 in FIG. 7 indicates that, at full load, the typical diesel engine operating at a steady lambda consistently achieves a less than optimal lambda. This discrepancy is particularly high at low engine speed and remains high up to approximately 2,300 rpm. On the other hand, a comparison of curve 234 to the curve 236 in FIG. 7 indicates that, at ¼ load (a typical light load condition), actual lambda is consistently and significantly higher than typical lambda in a typical diesel engine. The reasons for these discrepancies can be understood with reference to FIGS. 8 and 9. Curve 238 in FIG. 8 indicates that, in a diesel engine, optimum lambda at rated engine speed varies somewhat dramatically from a maximum value of about 4.0 at ¼ load or less to a minimum value of less than 2.0 at full load. A comparison of this curve to curves 240, 242, and 244 indicate that this variation is typically much greater than that required by gas-fueled engines and even by dual fuel or compression ignited gas fueled engines. This variation of lambda with engine load at a particular speed is confirmed by the curves 248 and 249 in FIG. 9 which illustrate that lambda in a conventional (non-optimized) diesel engine lambda tends to increase with increased engine speed and decreased load.

4. Compression Temperature Modulation

As discussed above, modulating the air charge temperature (ACT) results in a modification of lambda. Modulating ACT also necessarily modulates compression temperature, i.e., the effective temperature within the cylinder at the time of fuel injection. It has been discovered that, just as an engine operating under a particular load and speed condition exhibits an optimum lambda, it also exhibits an optimum compression temperature because the ignition characteristics of a compression ignition engine are strongly influenced by the compressed air temperature at the time of fuel injection. It then becomes both possible and prudent to determine and control the optimum values of both lambda and ACT and to modulate engine operation to achieve and maintain these values.

The effects of compression temperature modulation can be appreciated from a realization that the ignition delay period of conventional diesel fuel (Tid) is inversely proportional to the fifth power of the absolute temperature of the compression temperature as indicated by the following equation:

$$Tid = 4C/Patm(1000/T)^5 \quad \text{EQ. 1}$$

where:

Tid is ignition delay in milliseconds

T is absolute temperature deg K

C is a correction coefficient that allows compensation for other factors such as cetane No. that can affect the absolute value of ignition delay time; and Patm is the compression pressure in atmospheres.

Equation (1) is only an approximation and will be affected by other variables such as fuel temperature and cetane No. However, the effect on ignition delay will remain as an inverse function of about the fifth power of temperature.

The absolute temperature of compression (Tc) in turn is nearly linearly proportional to ACT as approximated by the following equation:

$$Tc = (ACT)(CR)^{(n-1)} \quad \text{EQ. 2}$$

where:

CR is the engine's compression ratio; and n is approximately 1.34 for a typical diesel engine.

For example, at an ACT of 300 K and a compression ratio of 18:1, the calculated compression temperature is:

$$Tc = 300(18^{0.34}) = 801 \text{ K} \quad \text{EQ. 3}$$

For this temperature and a peak pressure of 48 bar and C=1.0, the calculated ignition delay period is approximately 0.25 milliseconds.

By increasing the ACT to 350 K (an increase of only 50 K), the ignition delay period will be reduced from 0.25 milliseconds or 3.0 degrees crank angle to approximately 0.11 milliseconds, or 1.3 degrees crank angle at 1800 rpm. Since the resultant time interval is very short, the normal adverse effects caused by pre-mixed combustion usually become negligible, thus minimizing the need for pilot or split injection, and thereby reducing duration of injection, burn time, fuel consumption and smoke emissions. ACT control therefore is highly desirable.

ACT can be adjusted by various techniques, but the preferred embodiment is to modulate the input power to the series supercharger 92 (by modulation of the supercharger power control valve 112) followed by modulation of the TAB valve 100 and modulation of the intercooler bypass and control valves 134 and 136. ACT can be raised by 1) increasing compressor output temperature by closing the supercharger control valve 112, 2) bypassing the intercooler 130 and any aftercooler heat exchanger, e.g, by opening the valve 134 and closing the valve 136 and 3) delaying intake valve opening to increase the effective compression temperature. ACT can be further increased and MAP decreased by bypassing and recirculating air directly from the compression outlets to the compression inlets of the supercharger 92 and turbocharger 90. It is noteworthy that the recirculation of air from the supercharger outlet line 106 to the supercharger inlet or air inlet line 96 can be used to increase ACT to aid starting and idle under conditions of cold ambient temperatures. ACT can be lowered to a temperature at or near the ambient air temperature by 1) decreasing compressor output pressure by opening the supercharger control valve 112 and 2) increasing intercooling by closing the valve 134 and opening the valve 136.

In some cases, engine performance can be further enhanced by reduction of ACT below ambient air temperature. Such additional reduction can be accomplished through the early closing of the camless controllable intake valves 62 (also known as the "Miller" cycle) which reduces the effective compression ratio and thereby reduces the effective ACT since the end result is a reduction in compression temperature and lower $NO_x$ emissions. Early (or late) closing of the intake valves reduces the effective compression ratio and therefore has the same effect on compression temperature as a reduction in ACT.

The camless, controllable intake and exhaust valves 62 and 64 can be used to obtain benefits other than ACT control. For instance, at light load, the ECU 150 can control the valves 62 and 64 to remain closed for selected cycles to effect skip fire of both fuel and air. This skip fire will increase the ACT control range and enhance engine performance. During optimized skip fire control, the optimum firing fraction (OFF) (i.e., the optimum fraction of cylinders firing in a given firing cycle) is selected to achieve the desired effect under the prevailing engine operating conditions. Like $\lambda_{OPT}$ and $ACT_{OPT}$, $OFF_{OPT}$ at particular engine operating parameters preferably is stored in the ECU as a map. An exemplary procedure for deriving this map is detailed in Section 5 below.

Figure 10:
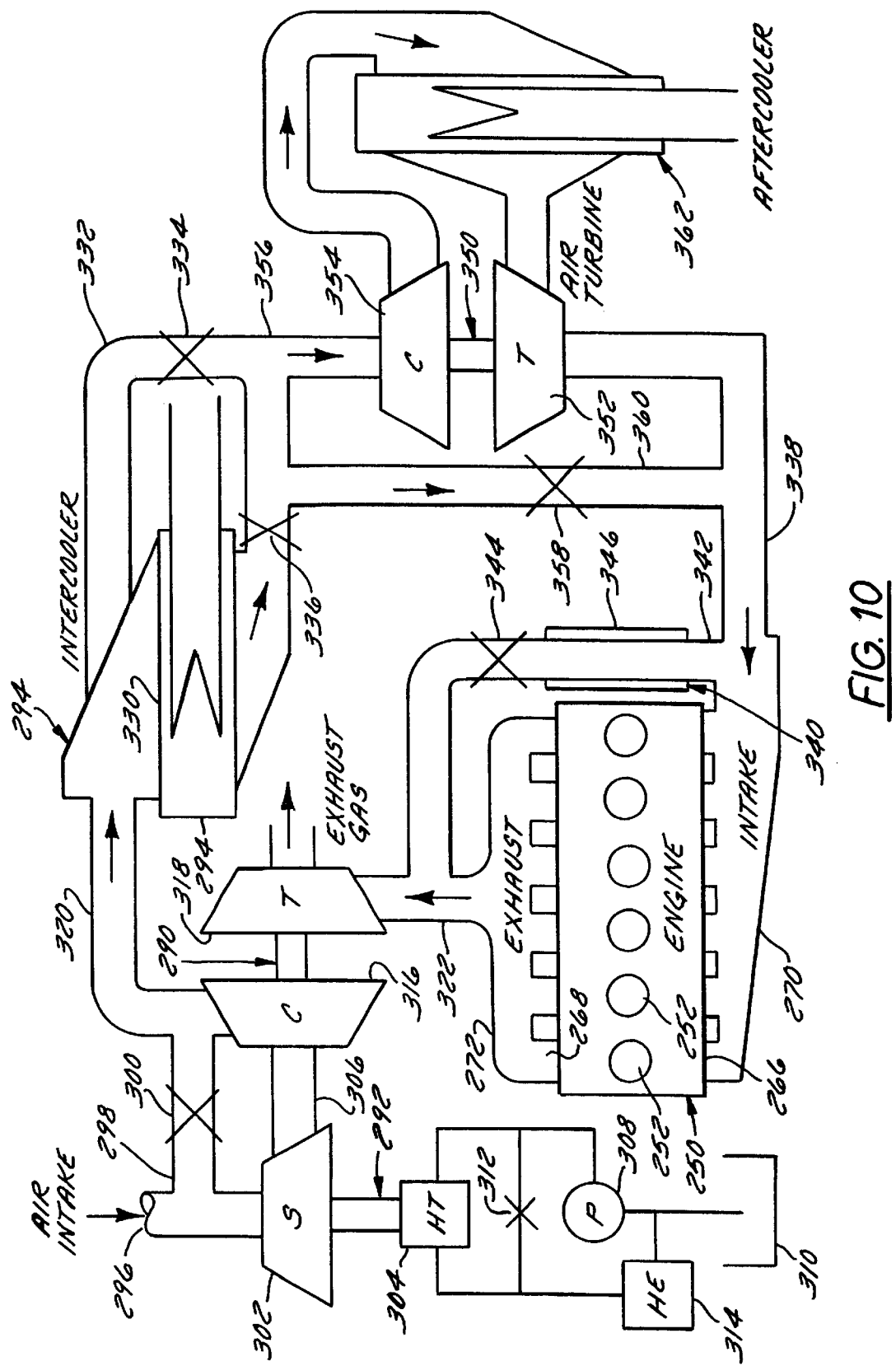
FIG. 10 is a schematic representation of the air supply system of a diesel engine constructed in accordance with a second preferred embodiment of the invention.

The description thus far presented assumes that the intake and exhaust valves 62 and 64 are electronically operated, camless valves. These electronically controlled valves might not be available on some engines. However, at least one of their desired effects, i.e., reduction in ACT to below ambient temperature, can be achieved by use of a turboexpander. An engine 250 having a turboexpander for these purposes is illustrated in FIG. 10. Engine 250 differs from the engine 50 of FIGS. 4–6 only in that 1) its intake and exhaust valves (not shown) are conventional, cam-operated valves and 2) it includes a turboexpander 350. Components of the engine 250 of FIG. 10 corresponding to components of the engine 50 of FIGS. 4–6 are designated by the same reference numerals, incremented by 200.

The engine 250 includes a plurality of cylinders 252. The cylinders 252 are supplied with air via an air supply control system and fuel via a fuel supply system. The fuel supply system is identical to that illustrated in FIG. 4 and discussed above. The air supply system includes a turbocharger 290, a series supercharger 292, an intercooler assembly 294, and a turboexpander 350. The supercharger 292 includes a compressor 302, a turbine 304, a pump 308, a reservoir 310, a supercharger control valve 312, and an oil cooler 314. The turbocharger 290 includes a compressor 316 and a turbine 318. A TAB valve 300 permits partial or complete turbocharger bypass. The intercooler assembly 294 includes an intercooler 330, an intercooler control valve 336, and an intercooler bypass valve 334 located in a bypass line 332. An EGR subassembly 340 (if present) includes an EGR line 342 in which is disposed an EGR valve 344 and an EGR cooler assembly 346.

The turboexpander 350 is located in the air supply system so as to selectively cool intake air to below ambient temperature prior to its induction into the intake manifold 270. The turboexpander 350 preferably is located downstream of the intercooler 330 so as to act on the lowest-available temperature air. The turboexpander 350 includes 1) an expansion turbine 352 located in a branch line 356 of the air intake line system and 2) an air compressor, hydraulic pump, or other energy absorbing device 354 connected to the turbine 352. Air flowing through the turbine 352 transfers energy in the form of heat to the turbine and thereby is cooled. This heat then is absorbed by the turbo compressor 354 or other energy absorption device. The cooling effect of the turbine 352 can be modulated through the control of a turboexpander control valve 358 located in a line 360 that bypasses the turbine 352. This valve 358 is a variable-orifice, electronically actuated valve controllable by the ECU 150 so as to vary the cooling effect of the turboexpander 350 from 0 to a maximum depending upon the closing degree of the valve 358. A more elegant and more efficient alternative is to use a variable area nozzle on the turboexpander turbine 352 to replace the turboexpander control valve 358.

ACT can also be reduced to below ambient temperature using a device such as an aftercooler 362 in combination with the turboexpander 350. The illustrated aftercooler 362 is disposed in a line 364 leading from the outlet of the turboexpander compressor 354 to the inlet of the turboexpander turbine 352. The cooling effect of the aftercooler can be modulated by modulating the fraction of total turboexpander airflow that flows through the aftercooler 362.

Figure 12:
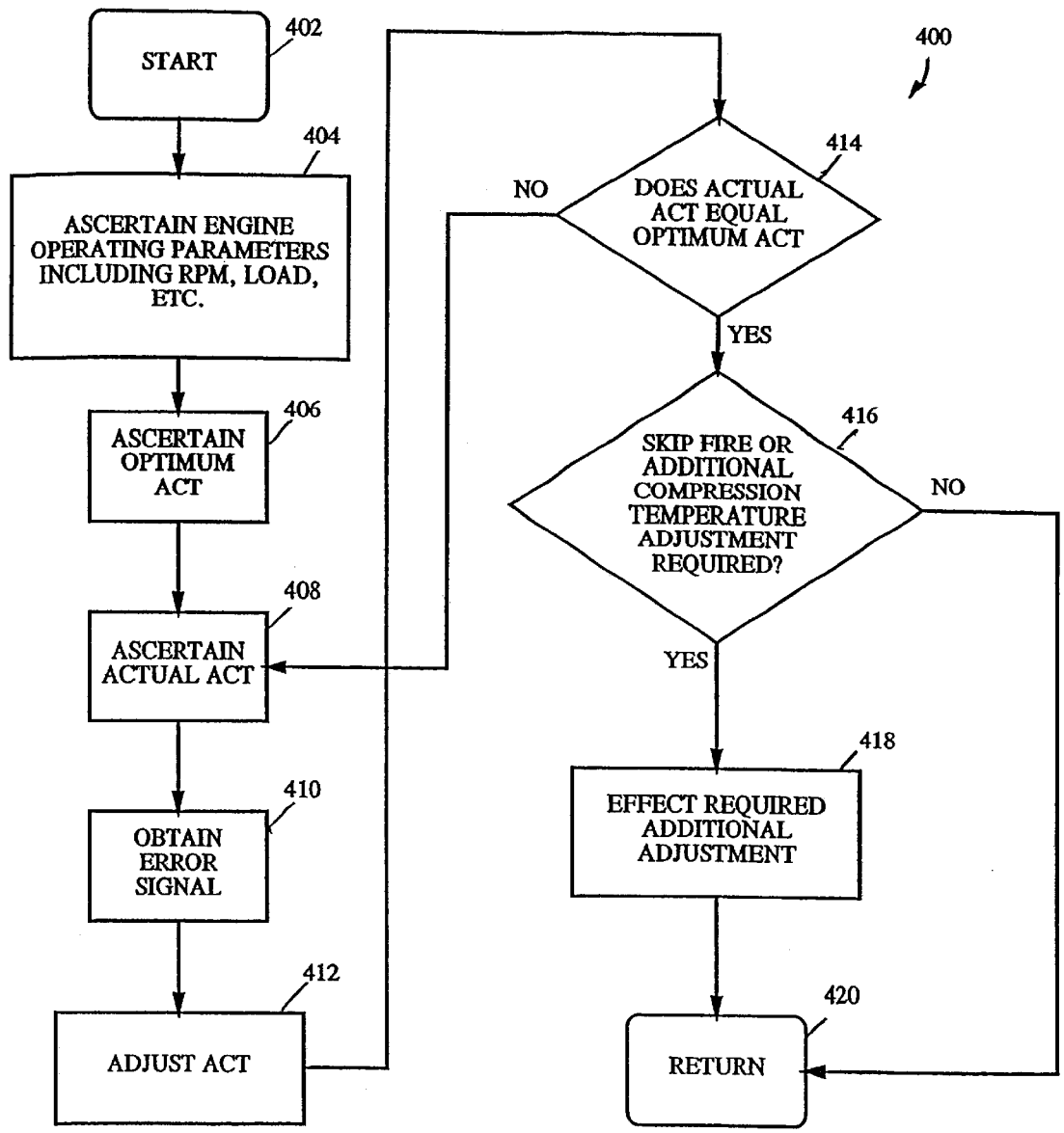
FIG. 12 is a flow chart of a closed loop, full range, and full time control scheme for the optimization of ACT in accordance with the invention.

Referring now to FIG. 12, a routine 400 is illustrated for optimizing compression temperature through ACT adjustment on a cylinder by cylinder and cycle by cycle basis. The routine 400 is described in conjunction with the engine 250 of the second embodiment and the accompanying turboexpander control, it being understood that the same or similar routine is equally applicable to the engine 50 of the first embodiment and the accompanying intake and exhaust valve control. The routine 400 proceeds from start at block 402 to block 404 in which engine operating parameters including RPM, load, lambda, etc., are ascertained using, for example, input from the speed sensor 156, power demand sensor 152, lambda sensor 170, and other sensors in FIG. 6. Next, in block 406, an optimum ACT is ascertained for the prevailing engine operating conditions. As with lambda, the optimum ACT may vary from application to application depending upon the engine performance characteristic to be optimized. For instance, Equation 2 above could be solved for ACT to obtain a compression temperature which reduces ignition delay period and consequent premixed burning by an optimum amount. This optimal ACT value could also be modified to take into account prior or simultaneous lambda control. In the illustrated and preferred embodiment, ACT is optimized in conjunction with lambda optimization and skip fire to strike a desired balance between fuel economy and emissions. Optimal values of ACT at prevailing engine operating conditions are stored in a map that is located in the memory of the ECU 150 and that is generated using the routine 500 discussed in Section 5 below.

Next, the actual ACT ($ACT_{ACTUAL}$) is ascertained in block 408, preferably using a signal generated by the ACT sensor 162. The signal $ACT_{ACTUAL}$ is subtracted from the signal $ACT_{OPT}$ in block 410 to obtain an error signal $ERR_{ACT}$. Engine operation then is adjusted in block 412 to modulate ACT at a magnitude which is proportionate to the magnitude of the signal $ERR_{ACT}$. The adjustment procedure chosen will vary depending on whether or not the signal $ERR_{ACt}$ is positive or negative. If the signal $ERR_{ACT}$ is positive, thus indicating that $ACT_{OPT}$ is greater than $ACT_{ACTUAL}$ and that the ACT therefore needs to be increased, ECU 150 will close the TAB valve 300 to of the turbocharger 290 while closing the intercooler control valve 336 and opening the intercooler bypass valve 334 to eliminate or partially eliminate intercooling. The supercharger control valve 312 then is partially or fully closed and the compressor bypass valve (TAB) valve 300 is opened by an amount designed to increase the output temperature of the supercharger 292 in proportion to the magnitude of the error signal $ERR_{ACT}$.

If, on the other hand, the signal $ERR_{ACT}$ is negative, indicating that $ACT_{ACTUAL}$ is greater than $ACT_{OPT}$ and that $ACT_{ACTUAL}$ therefore needs to be decreased, the TAB valve 300 is controlled to increase MAP, and valves 334, 336, and 358 are adjusted to reduce ACT by intercooling and/or turboexpansion enhancement. If cooling of ACT to a temperature below ambient temperature is required, the additional cooling effect of the turboexpander 350 can also be utilized through the closing or partial closing of the turboexpander control valve 358 and TAB valve 300.

Next, in block 414, the ECU 150 again inquires whether or not $ACT_{ACTUAL}$ equals $ACT_{OPT}$. If not, the procedures of blocks 408, 410, 412, and 414, are repeated in a closed loop routine until ACT is optimized for the prevailing engine operating conditions. Then, in step 416, an inquiry is made as to whether or not skip fire or other adjustment that is not necessarily related to optimal ACT is required. If not, the routine 400 proceeds directly to the return block 420. If so, the routine 400 effects the required additional adjustment in block 418 before proceeding to the return block 420.

The routine 400 does not detect transient operation and accordingly, does not react to it. However, transient operation easily could be detected and accounted for if desired using the same strategy discussed in conjunction with FIG. 11 above.

As with lambda control, the above process is repeated continuously on a full time, full range basis for each cylinder so that ACT remains optimized whenever the engine is operating. This control scheme represents a marked departure from standard diesel engine control schemes which typically operate at higher than optimal ACT at high load and lower than optimal ACT at light load.

5. Determination of Optimal Lambda, ACT, and OFF

The optimum values of lambda, ACT, OFF and possibly other engine operating parameters to be controlled pursuant to the invention could be determined mathematically based upon theoretical engine operation. For instance, a possible mathematical determination of ACT is discussed in Section 4 above, and a mathematical determination of OFF for a gaseous fueled engine is discussed in some detail in the Beck '575 patent described above. However, since there are numerous parameters which are affected by the adjustment of lambda and ACT, the selection of lambda, ACT, OFF, and other values for true performance optimization can be a complex procedure. However, if certain parameters are held constant while adjusting inlet temperature and inlet pressure separately, a simplified alternative optimization procedure can be established. One such procedure, implementable by the ECU 150 as a routine 500, will now be summarized with reference to FIGS. 13A–13C.

First, the routine 500 proceeds from start in block 502 to block 504 where signals from sensors 152–172 are used to obtain baseline performance data that obtains the best available trade-off between $NO_x$ emissions, fuel economy, smoke, and power, using conventional procedures without full time control of lambda, ACT, or OFF. Next, in block 506, a performance characteristic to be initially optimized is selected. In the illustrated embodiment, the first such per-selected performance characteristic (BSFC) then is evaluated (using data from selected ones of the sensors 160–172) so that a lambda is selected in block 510 for the optimum performance characteristic value under the prevailing $BSNO_x$, power, and speed conditions. As discussed above, this "optimum" value will vary with, among other things, the selected weighted importance of fuel economy versus emissions. An inquiry block 512 then is utilized to repeat the blocks 508 and 510 for the full range of $NO_x$ at the prevailing speed, load, and OFF conditions so that a map of optimum BSFC is obtained through the fill-range of speed, load and $NO_x$. A map of optimum lambda as a trade-off between $BSNO_x$ and the selected performance characteristic (BSFC in the first iteration) can then be obtained and stored in block 514. Typical maps generated at an intermediate point in the mapping process for a gas engine and a diesel engine are reproduced as Table 1 and Table 2, respectively. Each map represents optimum lambda for a full range of engine speed conditions. Additional maps would be generated over the operating ranges of load, ACT, etc.

TABLE 1

Optimum Lambda MAP - Natural Gas

| Fuel mm³/inj | Engine RPM | | | | | | | | | |
|---|---|---|---|---|---|---|---|---|---|---|
| | 700 | 1000 | 1200 | 1400 | 1600 | 1800 | 2000 | 2200 | 2400 | 2600 |
| 0 | 1.75 | 1.75 | 1.75 | 1.75 | 1.75 | 1.75 | 1.75 | 1.75 | 1.75 | 1.75 |
| 10 | 1.75 | 1.75 | 1.75 | 1.75 | 1.75 | 1.75 | 1.75 | 1.75 | 1.75 | 1.75 |
| 20 | 1.80 | 1.80 | 1.80 | 1.80 | 1.80 | 1.80 | 1.80 | 1.80 | 1.80 | 1.80 |
| 30 | 1.85 | 1.85 | 1.85 | 1.85 | 1.85 | 1.85 | 1.85 | 1.85 | 1.85 | 1.85 |
| 40 | 1.85 | 1.85 | 1.85 | 1.85 | 1.85 | 1.85 | 1.85 | 1.85 | 1.85 | 1.85 |
| 60 | 1.85 | 1.85 | 1.85 | 1.85 | 1.85 | 1.85 | 1.85 | 1.85 | 1.85 | 1.85 |
| 80 | 1.85 | 1.85 | 1.85 | 1.85 | 1.85 | 1.85 | 1.85 | 1.85 | 1.85 | 1.85 |
| 100 | 1.85 | 1.85 | 1.85 | 1.85 | 1.85 | 1.85 | 1.85 | 1.85 | 1.85 | 1.85 |
| 120 | 1.85 | 1.85 | 1.85 | 1.85 | 1.85 | 1.85 | 1.85 | 1.85 | 1.85 | 1.85 |
| 140 | 1.85 | 1.85 | 1.85 | 1.85 | 1.85 | 1.85 | 1.85 | 1.85 | 1.85 | 1.85 |

TABLE 2

Optimum Lambda MAP - Diesel

| Fuel mm³/inj | Engine RPM | | | | | | | | | |
|---|---|---|---|---|---|---|---|---|---|---|
| | 700 | 1000 | 1200 | 1400 | 1600 | 1800 | 2000 | 2200 | 2400 | 2600 |
| 0 | 3.00 | 3.00 | 3.00 | 3.00 | 3.00 | 3.00 | 3.00 | 3.00 | 3.00 | 3.00 |
| 10 | 2.50 | 2.50 | 2.50 | 2.50 | 2.50 | 2.50 | 2.50 | 2.50 | 2.50 | 2.50 |
| 20 | 2.40 | 2.40 | 2.40 | 2.40 | 2.40 | 2.40 | 2.40 | 2.40 | 2.40 | 2.40 |
| 30 | 2.35 | 2.35 | 2.35 | 2.35 | 2.35 | 2.35 | 2.35 | 2.35 | 2.35 | 2.35 |
| 40 | 2.30 | 2.30 | 2.30 | 2.30 | 2.30 | 2.30 | 2.30 | 2.30 | 2.30 | 2.30 |
| 60 | 2.25 | 2.25 | 2.25 | 2.25 | 2.25 | 2.25 | 2.25 | 2.25 | 2.25 | 2.25 |
| 80 | 2.20 | 2.20 | 2.20 | 2.20 | 2.20 | 2.20 | 2.20 | 2.20 | 2.20 | 2.20 |
| 100 | 2.15 | 2.15 | 2.15 | 2.15 | 2.15 | 2.15 | 2.15 | 2.15 | 2.15 | 2.15 |
| 120 | 2.10 | 2.10 | 2.10 | 2.10 | 2.10 | 2.10 | 2.10 | 2.10 | 2.10 | 2.10 |
| 140 | 2.10 | 2.10 | 2.10 | 2.10 | 2.10 | 2.10 | 2.10 | 2.10 | 2.10 | 2.10 | formance characteristic to be optimized is brake specific fuel consumption (BSFC). Then, in block 508, lambda is varied (by control of the TAB valve 100 or 300, supercharger control valve 112, or 312, and/or intercooler valves 134, 136, 334, 336) while $BSNO_x$, power, ACT, OFF, and speed are held constant. The effects of that lambda variation on the Blocks 508 through 514 then are repeated (under the control of inquiry blocks 516 and 518) to repeat the calibration procedures for the full range of ACT and OFF. Maps of optimum lambda for a full range of speed, load, $NO_x$, ACT, and OFF conditions thereby is generated.

Next, optimum values of ACT for the selected performance characteristic (BSFC in the first iteration) is determined. This determination begins with block 520 where the routine 500 determines the effects of changes in ACT on the selected performance characteristic at constant values of lambda, OFF, power, and speed. The ACT which optimizes that performance characteristic under those conditions then is selected in block 522. An inquiry block 524 then causes the blocks 520 and 522 to be repeated for a full ranges of $NO_x$. The optimum ACT as a trade-off between $BSNO_x$ and the selected performance characteristic at the prevailing values of lambda, OFF, speed, and load then is mapped in block 526. A typical map generated at an intermediate point in the mapping process for a diesel engine is reproduced as Table 3. This map represents optimum ACT for a full range of engine speed conditions. Additional maps would be generated over the operating ranges of load, lambda, etc.

TABLE 3

Optimum ACT (Deg F.) MAP, Diesel

| Fuel mm³/inj | Engine RPM | | | | | | | | | |
|---|---|---|---|---|---|---|---|---|---|---|
| | 700 | 1000 | 1200 | 1400 | 1600 | 1800 | 2000 | 2200 | 2400 | 2600 |
| 0 | 160 | 155 | 150 | 145 | 140 | 135 | 130 | 130 | 125 | 120 |
| 10 | 150 | 145 | 140 | 140 | 135 | 130 | 120 | 120 | 120 | 115 |
| 20 | 150 | 145 | 135 | 130 | 125 | 120 | 110 | 110 | 110 | 110 |
| 30 | 140 | 135 | 125 | 120 | 115 | 110 | 110 | 110 | 105 | 105 |
| 40 | 130 | 125 | 115 | 110 | 105 | 100 | 90 | 85 | 85 | 90 |
| 60 | 120 | 115 | 105 | 100 | 95 | 90 | 80 | 80 | 80 | 80 |
| 80 | 110 | 105 | 95 | 90 | 85 | 80 | 70 | 70 | 70 | 70 |
| 100 | 100 | 90 | 85 | 80 | 75 | 70 | 60 | 60 | 60 | 50 |
| 120 | 85 | 80 | 75 | 70 | 65 | 60 | 60 | 60 | 60 | 60 |
| 140 | 75 | 70 | 65 | 60 | 55 | 50 | 50 | 50 | 50 | 50 |

Blocks 520 through 526 then are repeated (under the control of inquiry blocks 528 and 530) for the full range of lambda and OFF. Maps of optimum ACT for a full range of speed, load, $NO_x$, lambda, and OFF conditions thereby is generated.

The routine 500 then proceeds to block 532 to determine the effects of changes in OFF on the selected performance characteristic (BSFC in the first iteration) at constant lambda, ACT, $BSNO_x$, power, and speed. The optimum OFF for that performance characteristic then is selected in block 534, and an inquiry block 536 causes the blocks 532 and 534 to be repeated until a map of the trade-off between $BSNO_x$ and the selected performance characteristics at the constant values of lambda, ACT, power, and speed is stored in block 538. Blocks 532 through 538 are repeated (under control of inquiry blocks 540 and 542) for the full range of lambda and ACT. A map of optimum OFF for a full range of speed, load, $NO_x$, lambda, and ACT conditions thereby is generated.

Next, in block 544, the routine 500 determines whether or not any remaining performance characteristics such as smoke, particulates, etc. need to be evaluated. If not, i.e., if all performance characteristics to be taken into account have been evaluated, the routine 500 ends in block 548. If so, the routine 500 returns to block 506 under control of the block 546, and optimum values of lambda, ACT, and OFF are mapped for those performance characteristics.

The above-described mapping procedure could performed manually under steady state operation or by a computer controlled mapping routine of the type known to those skilled in the art.

6. Use of Three-Spool Supercharger for ACT Control

Figure 14:
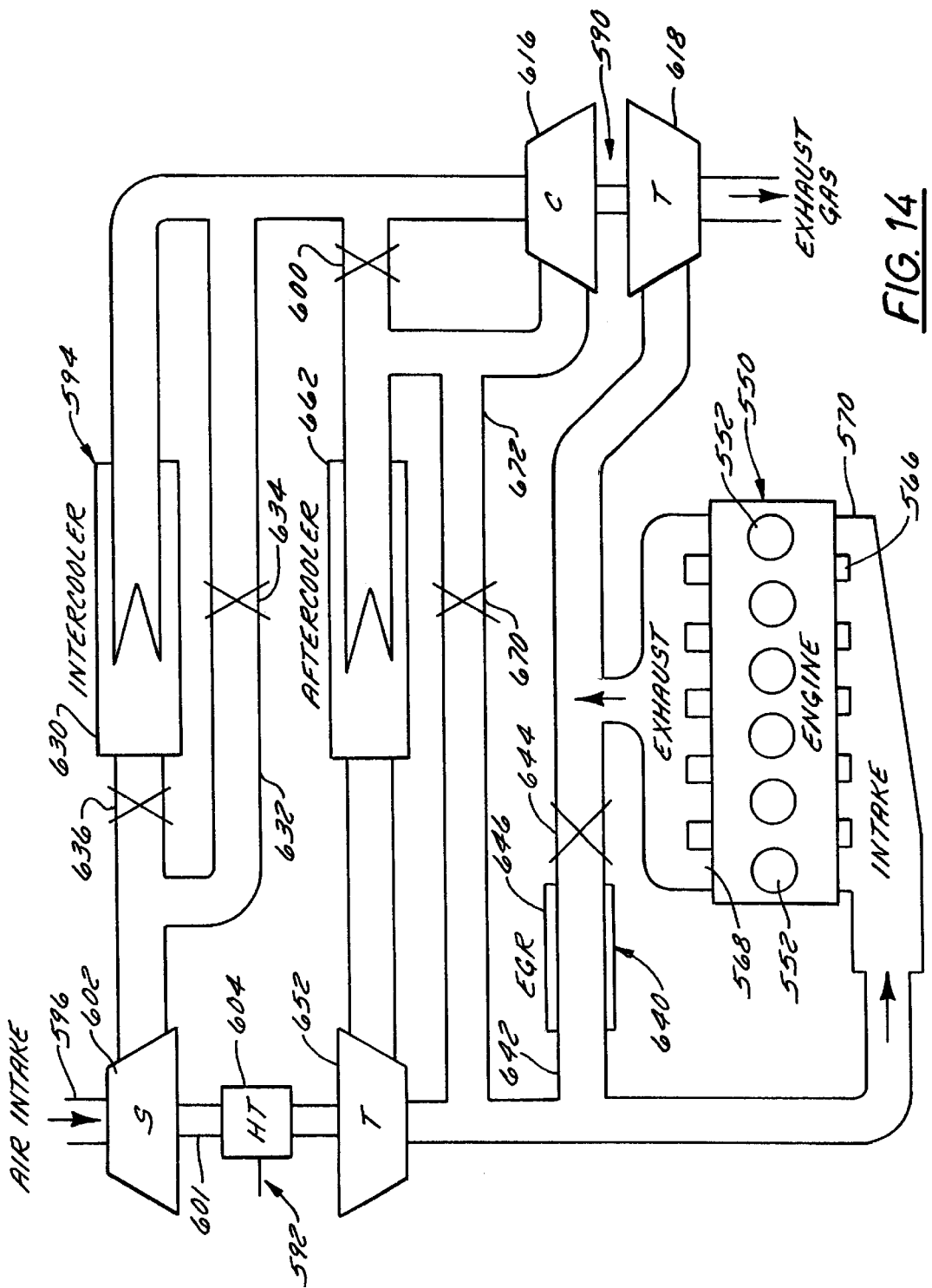
FIG. 14 is a schematic representation of the air supply system of a diesel engine constructed in accordance with a third preferred embodiment of the invention.

An alternative, more elegant approach to incorporating a separate turboexpander into an engine's air supply system for ACT control is to replace the supercharger with one that is also capable of performing the cooling functions of the turboexpander. The resulting air supply system is simpler, less expensive, and has fewer components than an engine employing a separate turbocharger and turboexpander. An engine 550 configured in this manner is illustrated in FIG. 14. Components of the engine 550 of FIG. 14 corresponding to components of the engine 250 of FIG. 10 are designated by the same reference numerals, incremented by 300.

The engine 550 includes a plurality of cylinders 552 supplied with air via an air supply system and with fuel via a fuel supply system. The fuel supply system is identical to that illustrated in FIGS. 5 and 10 discussed above. The air supply system includes a turbocharger 590, a combination supercharger/turboexpander 592, an intercooler assembly 594, and an aftercooler 662. The turbocharger 590 includes a compressor 616 and a turbine 618. A TAB valve 600 permits selective recirculation of turbocharged air back to the system's intake line 596. The intercooler assembly 594 includes an intercooler 630, an intercooler control valve 636, and an intercooler bypass valve 634 located in a bypass line 632. An EGR subassembly 640 (if present) includes an EGR line 642 in which is disposed an EGR valve 644 and an EGR cooler assembly 646.

The combined supercharger/turboexpander 592, like the supercharger 292 of the FIG. 10 embodiment, includes a compressor 602 and a hydraulic turbine 604 mounted on a common shaft 601. Also included but not illustrated are a reservoir, a supercharger control valve and an oil cooler for supplying power to the turbine 604. However, unlike in the previous embodiments, a separate expansion turbine 652 is also mounted on the shaft 601 in order to perform the cooling function of the expansion turbine of the turboexpander of the FIG. 10 embodiment. Superchargers having three operative devices mounted on the same shaft are sometimes known in the art as "three spool" superchargers. A suitable three spool supercharger is disclosed in U.S. Pat. No. 4,285,200 to Bryne et al., the subject matter of which is hereby incorporated by reference. The turbocharger disclosed in the Bryne et. al. patent includes a turbocharger operable as the compressor 602 of the combined supercharger/turboexpander 592, a hydraulic turbine operable as the hydraulic turbine 604 of the combined supercharger/turboexpander 592, and a turbine wheel which, when coupled to the remainder of the air supply system as illustrated in FIG. 14, is operable as the turbine 652 of the combined supercharger/turboexpander 592 (it should be noted that, prior to the development of the present invention, the turbine or third spool disclosed in the Bryne patent was not intended for use as a gas cooling device). The turbine 652, like the expansion turbine 352 of the turboexpander 350 of the FIG. 10 embodiment, is located in a branch line of the air supply system in a location downstream of the intercooler assembly 594 and is controlled by operation of a control valve 670 located in a line 672 that bypasses the expansion turbine 652 and the aftercooler 662. This valve 670 is a variable-orifice, electronically actuated valve controllable by the ECU 150 so as to vary the cooling effect of the turboexpander turbine 652 from zero to a maximum depending upon the closing degree of the valve 670. In use, air flowing through the turbine 652 transfers energy in the form of heat to the turbine 652 and thereby is cooled. This energy then is absorbed by the compressor 602 which, as detailed above, also functions as the turbocharger compressor. The cooling effect of the turbine 652 can be modulated through the control of the control valve 670.

It can thus be seen that the compression and energy absorption functions can be achieved by a single structure which is mounted on the same shaft as the remaining supercharger components. The resultant system is simpler, more elegant, and less expensive than a system employing a separate supercharger and turboexpander. In addition, the engine 550, like the Engine 250 of the FIG. 10 embodiment, is capable of using propane as a fuel because the combined supercharger/turboexpander 592, like the turboexpander of the FIG. 10 embodiment, is capable of reducing ACT to below ambient temperature, which is required to avoid engine knock when burning propane under high load.

7. Comments on Exhaust Gas Recirculation (EGR)

The effect of EGR on the reduction of $NO_x$ emissions in diesel engine exhaust is well known and can be quite effective. However, for reasons that will become apparent, EGR may not be necessary with the present invention and its deleterious effects that argue for its elimination or at least for limiting its use.

EGR causes a reduction in $NO_x$ by two effects, namely: 1) reduction in peak compression temperature and the corresponding peak cycle (average) temperature; and 2) reduction in stoichiometric flame temperature by reduction of oxygen concentration and dilution of the combustion reaction. Since selection of optimum lambda will affect peak cycle temperature and, to a lesser extent, stoichiometric flame temperature, it would appear to be prudent to select optimum lambda prior to the addition of EGR. With such an approach, the optimum lambda system can be treated as a stand-alone system and operated with or without EGR. Moreover, for gas fueled engines EGR and increased lambda have almost the same effect on reduction of $NO_x$ because, in the case of lean burn premixed combustion, there is little or no stoichiometric flame. Consequently, for pre-mixed combustion, EGR can be totally replaced by increased lambda. In diesel engines, the extent of stoichiometric burning (inevitable with a heterogeneous fuel air mixture) can be minimized by faster injection, atomization and vaporization. The most effective use of EGR therefore can be made after the optimization of lambda, ACT and fuel and air mixing for either gas fueled premix engines or diesel engines.

$NO_x$ emissions can be greatly reduced when a diesel engine runs on pre-mixed fuel and air with compression ignition using a liquid pilot fuel. This is because the stoichiometric burning that occurs around burning droplets is eliminated and the peak temperature is limited largely to that of a lean burn mixture rather that the flame temperature of a stoichiometric mixture. High injection pressure serves the function of increasing turbulent mixing and thereby reduces the fraction of the fuel that burns at overly rich mixture. EGR, on the other hand, functions as a $NO_x$ reducer largely by reducing the stoichiometric flame temperature and normally does not enhance mixing.

Some investigators have reported that $NO_x$ is reduced by the addition of EGR at fixed injection timing of the pilot fuel. However, it is now believed that this effect occurs at least partially because of an increase in ignition delay which thus effectively retards ignition timing and reduces $NO_x$ by 70% per degree of ignition retard. If diesel combustion is managed to emulate pre-mixed lean burn combustion, $NO_x$ can be controlled by lambda, ACT and ignition timing alone. In such cases EGR, becomes neither necessary nor desirable.

8. CONCLUSIONS

It can thus be seen that, when applied to an internal combustion engine, the combination of a series supercharger, variable nozzle turbocharger and turboexpander under appropriate control can be used to extend the range of temperature, pressure and lambda both upwardly and downwardly to obtain optimum values. Most conventional procedures for lambda control allow only one direction control of temperature, pressure or lambda through at best only a limited range and are not specifically regulated toward an optimum value. The invention's operating strategy therefore offers new tools for optimizing engine performance and reducing exhaust emissions and should encourage the use of special air and fuel supply devices for optimizing control of air and fuel to optimize engine performance and reduce exhaust emissions, especially in view of the forthcoming EPA levels for the year 2004. The approach presented here has the potential to obviate the need for more complex options such as exhaust gas recirculation (EGR), EGR coolers, EGR back pressure valves, waste gates, particulate traps and special fuel additives. The use of camless, electronically-controlled intake and exhaust valves (if available) may further enhance the capability of the system by using skip fire of both air and fuel and other strategies for modifying the combustion cycle. The strategies and techniques proposed are applicable to all compression ignited internal combustion engines but are particularly applicable to diesel (liquid fueled) engines where the need for true lambda and/or ACT optimization was not previously recognized.

Many changes and modifications could be made to the invention without departing from the spirit thereof. The scope of some of these changes are discussed above. Other changes and modifications falling within the scope of the invention will become apparent from the appended claims.

We claim:

1. A method of optimizing excess air ratio (lambda) in a liquid-fueled compression ignition engine, comprising:
   (A) monitoring operation of said engine;
   (B) determining an optimum lambda for optimizing at least one of a plurality of engine performance characteristics at prevailing engine speed and load conditions, said optimal lambda varying in response to different engine speed and load conditions and the at least one of the plurality of engine performance characteristics; and
   (C) automatically adjusting at least one engine operating parameter so as to cause the actual lambda to selectively increase and decrease to approach the optimum lambda at the prevailing speed and load conditions.

2. A method as defined in claim 1, further comprising automatically repeating the steps (A) through (C) in a closed loop and on a cylinder by cylinder and cycle by cycle basis for so long as said engine is operating so as to obtain and maintain an actual lambda which at least essentially equals the optimum lambda.

3. A method as defined in claim 2, wherein
   the monitoring step includes monitoring an engine operating parameter indicative of the actual lambda and then calculating the actual lambda, and
   the adjusting step comprises 1) obtaining an error signal representative of the difference between the optimum lambda and the actual lambda, and 2) adjusting the engine operating parameter by a magnitude which is dependent on the magnitude of the error signal.

4. A method as defined in claim 3, wherein the adjusting step comprises adjusting inlet air pressure for a turbocharger of said engine.

5. A method as defined in claim 1, wherein the selected engine performance characteristic is one of brake specific energy consumption (BSEC) and brake specific $NO_x$ emissions ($BSNO_x$).

6. A method as defined in claim 5, wherein the optimum lambda is one which strikes an optimum trade-off between BSEC and $BSNO_x$ at prevailing engine operating conditions.

7. A method as defined in claim 1, wherein the optimum lambda is one which minimizes smoke and particulate emissions at prevailing engine operating conditions.

8. A method as defined in claim 1, further comprising adjusting compression temperature by adjusting cylinder valve operation timing.

9. A method as defined in claim 8, further comprising selectively suppressing operation of intake and exhaust valves of said engine to obtain skip fire of both air and fuel.

10. A method as defined in claim 1, further comprising adjusting fuel flow to said engine under transient engine operating conditions under which the optimum lambda cannot be obtained by control of airflow alone.

11. A method of optimizing excess air ratio (lambda) in a liquid-fueled compression ignition engine, comprising:
    (A) monitoring operation of said engine;
    (B) determining an optimum lambda for optimizing a selected engine performance characteristic at a prevailing engine operating condition;
    (C) automatically adjusting at least one engine operating parameter so as to cause the actual lambda to approach the optimum lambda; and
    (D) adjusting the operation of a supercharger which is located in series with a turbocharger thereby to adjust inlet air pressure for said turbocharger.

12. A method of optimizing excess air ratio (lambda) in a compression ignition engine, comprising:
    (A) monitoring operation of said engine;
    (B) determining an optimum lambda for optimizing a selected engine performance characteristic at a prevailing engine operating condition; and
    (C) automatically adjusting at least one engine operating parameter so as to cause the actual lambda to selectively increase and decrease to approach the optimum lambda; and
    (D) determining an optimum ACT for a selected engine performance characteristic at a prevailing engine operating condition;
    (E) adjusting at least one engine operating parameter so as to cause an actual ACT to approach the optimum ACT; and
    (F) repeating the ACT determining and adjusting steps in a closed loop until the actual ACT at least essentially equals the optimum ACT.

13. A method as defined in claim 12, wherein the adjusting step comprises adjusting at least one of 1) cylinder intake valve operation timing, 2) operation of an intercooler located between a turbocharger of said engine and an air intake manifold of said engine, and 3) operation of an expansion turbine located between said turbocharger and said air intake manifold of said engine.

14. A method as defined in claim 13, wherein said expansion turbine is a turbine of a turboexpander located downstream of a supercharger of said engine.

15. A method as defined in claim 13, wherein said expansion turbine is a turbine of a combined supercharger/turboexpander assembly of said engine.

16. A method as defined in claim 13, further comprising reducing ACT to below ambient temperature using said expansion device in combination with an aftercooler.

17. A method of optimizing air charge temperature (ACT) in a compression-ignition engine, comprising:
    (A) monitoring operation of said engine;
    (B) determining an optimum ACT for optimizing a selected engine performance characteristic at a prevailing engine operating condition; and
    (C) automatically adjusting at least one engine operating parameter so as to cause the actual ACT to approach the optimum ACT.

18. A method as defined in claim 17, further comprising automatically repeating the steps (A) through (C) in a closed loop control strategy for so long as said engine is operating so as to obtain and maintain an actual ACT which at least essentially equals the optimum ACT.

19. A method as defined in claim 17, wherein the adjusting step comprises adjusting inlet air pressure for a turbocharger of said engine.

20. A method as defined in claim 19, wherein the adjusting step comprises adjusting the operation of a supercharger which is located in series with said turbocharger thereby to adjust the inlet air pressure for said turbocharger.

21. A method as defined in claim 17, wherein the adjusting step comprises adjusting at least one of 1) cylinder intake valve operation timing, 2) operation of an intercooler located between a turbocharger of said engine and an air intake manifold of said engine, and 3) operation of an expansion turbine located between said turbocharger and said air intake manifold of said engine.

22. A method as defined in claim 17, further comprising adjusting compression temperature by adjusting cylinder valve operation timing.

23. A method of optimizing performance of a compression ignition engine, comprising the steps of:
(A) monitoring engine operation to obtain an indication of prevailing engine operating conditions;
(B) determining, based upon prevailing engine operating conditions, optimum values of excess air ratio (lambda) and air charge temperature (ACT) required to optimize a selected engine performance characteristic;
(C) determining the actual lambda and the actual ACT;
(D) automatically adjusting at least one engine operating parameter to cause both the actual ACT and the actual lambda to approach the optimum ACT and the optimum lambda; and
(E) automatically repeating steps (A) through (D) in a closed loop control strategy so as to obtain and maintain essentially optimum values of ACT and lambda at prevailing engine operating conditions.

24. A method as defined in claim 23, wherein the adjusting step comprises adjusting both ACT and lambda by adjusting the operation of a supercharger located in series with a turbocharger thereby to adjust the inlet air pressure for said turbocharger.

25. A method as defined in claim 23, wherein the adjusting step comprises adjusting ACT and the resulting compression temperature by adjusting at least one of 1) cylinder intake valve operation timing, 2) operation of an intercooler located between a turbocharger of said engine and an air intake manifold of said engine, and 3) operation of an expansion turbine located between said turbocharger and said air intake manifold of said engine.

26. A method as defined in claim 23, further comprising adjusting compression temperature by adjusting cylinder valve operation timing.

27. A method as defined in claim 26, further comprising selectively suppressing operation of intake and exhaust valves of said engine to obtain skip fire of both air and fuel.

28. A method as defined in claim 23, wherein the adjusting step comprises 1) obtaining first and second error signals representative of the difference between the optimum lambda and the actual lambda and the difference between the optimum ACT and the actual ACT, respectively, and 2) adjusting at least one engine operating parameter by a magnitude which is dependent on the magnitudes of the first and second error signals.

29. A method of optimizing performance of a compression ignition engine, comprising the steps of:
(A) monitoring engine operation to obtain an indication of prevailing engine operating conditions;
(B) determining, based upon prevailing engine operating conditions, optimum values of excess air ratio (lambda) and air charge temperature (ACT) required to optimize an engine performance characteristic;
(C) determining the actual lambda and the actual ACT;
(D) comparing the actual lambda and the actual ACT to the optimal lambda and the optimal ACT and, if necessary to cause the actual lambda and the actual ACT to approach the desired lambda and the desired ACT, selectively and automatically
(1) increasing lambda by increasing the pressure of a turbocharger of said engine by adjusting the operation of a supercharger which is located in series with the turbocharger,
(2) decreasing lambda by decreasing the pressure of the turbocharger by adjusting the operation of the supercharger,
(3) increasing ACT by at least one o
(a) recirculating air from an outlet of a compressor of said turbocharger, through a supercharger, and back to an inlet of said compressor of said turbocharger prior to inducting the recirculated air into an intake manifold of said engine,
(b) decreasing a percentage of total intake airflow through an intercooler located downstream of said turbocharger, and
(c) decreasing a percentage of intake air flowing through an aftercooler and an expansion turbine located downstream of said intercooler, and,
(4) decreasing ACT by at least one of
(a) increasing the pressure of the turbocharger by adjusting the operation of the supercharger,
(b) increasing the percentage of total intake airflow through the intercooler, and
(c) increasing the percentage of intake air flowing through said aftercooler and said expansion turbine; and
for so long as said engine is operating, repeating steps (A) through (D) in a closed loop routine so as to obtain and maintain optimum values of ACT and lambda at prevailing engine operating conditions.

30. A method as defined in claim 29, further comprising adjusting compression temperature by adjusting cylinder valve operation timing.

31. A method as defined in claim 29, further comprising selectively suppressing operation of intake and exhaust valves of said engine to obtain skip fire of both air and fuel.

32. A liquid fueled compression ignition internal combustion engine comprising:
(A) a plurality of cylinders each having an intake port and exhaust port;
(B) a fuel supply system which selectively supplies a fuel to said cylinders, wherein said fuel is one which ignites by compression;
(C) an air supply system which supplies air to said intake ports of said cylinders; and
(D) electronic control means for controlling operation of at least one of said air supply system and said fuel supply system to:
(1) monitor operation of said engine;
(2) determine an optimum lambda for optimizing a selected engine performance characteristic at prevailing engine speed and load conditions, the optimal lambda varying with varying speed and load conditions; and
(3) automatically adjust at least one engine operating parameter so as to cause the actual lambda to selectively increase and decrease to approach the optimum lambda at the prevailing speed and load conditions; and
(4) repeat operations (1) through (3) on a full time, a full range basis.

33. A compression ignition internal combustion engine comprising:
(A) a plurality of cylinders each having an intake port and exhaust port;
(B) a fuel supply system which selectively supplies a fuel to said cylinders, wherein said fuel is one which ignites by compression;

(C) an air supply system which supplies air to said intake ports of said cylinders; and
(D) electronic control means for controlling operation of at least one of said air supply system and said fuel supply system to:
 (1) monitor operation of said engine;
 (2) determine an optimum lambda for optimizing a selected engine performance characteristic at a prevailing engine operating condition the optimal lambda varying with engine operating conditions; and
 (3) automatically adjust at least one engine operating parameter so as to cause the actual lambda to selectively increase and decrease to approach the optimum lambda; and
 (4) repeat operations (1) through (3) on a full time, a full range basis;
(E) electronic control means for controlling operation of at least one of said air supply system and said fuel supply system to:
 (1) monitor operation of said engine;
 (2) determine an optimum lambda for optimizing a selected engine performance characteristic at a prevailing engine operating condition; and
 (3) automatically adjust at least one engine operating parameter so as to cause the actual lambda to selectively increase and decrease to approach the optimum lambda; and
(E) a turbocharger having an air outlet in fluid communication with the intake ports of the cylinders and having an air inlet;
(F) a supercharger having an air outlet in fluid communication with said air inlet of said turbocharger and having an air inlet; and
(G) a control device which is coupled to said electronic control means and which selectively controls operation of said supercharger.

34. An engine as defined in claim 33, wherein said air supply system further comprises a turboexpander which is located downstream of said turbocharger.

35. An engine as defined in claim 33, wherein said air supply system further comprises a turbo air bypass (TAB) valve which is coupled to said electronic control means and which is actuatable to selectively permit at least partial bypass of said supercharger and said turbocharger.

36. A compression ignition internal combustion engine comprising:
(A) a plurality of cylinders each having an intake port and exhaust port;
(B) a fuel supply system which selectively supplies a fuel to said cylinders, wherein said fuel is one which ignites by compression;
(C) an air supple system which supplies air to said intake ports of said cylinders; and
(D) electronic control means for controlling operation of at least one of said air supply system and said fuel supple system to:
 (1) monitor operation of said engine;
 (2) determine an optimum lambda for optimizing a selected engine performance characteristic at a prevailing engine operating condition the optimal lambda varying with engine operating conditions; and
 (3) automatically adjust at least one engine operating parameter so as to cause the actual lambda to selective increase and decrease to approach the optimum lambda; and
 (4) repeat operations (1) through (3) on a full time, a full range basis;
(G) a combined supercharger/turbo expander assembly having
 (1) a first air inlet,
 (2) a first air outlet in fluid communication with said air inlet of said turbocharger,
 (3) a second air inlet in fluid communication with said air outlet of said turbocharger, and
 (4) a second air outlet in fluid communication with the intake ports of the cylinders.

37. A compression ignition internal combustion engine comprising:
(A) a plurality of cylinders each having an intake port and exhaust port;
(B) a fuel supply system which selectively supplies a fuel to said cylinders, wherein said fuel is one which ignites by compression;
(C) an air supply system which supplies air to said intake ports of said cylinders; and
(D) electronic control means for controlling operation of at least one of said air supply system and said fuel supply system to
 (1) monitor engine operation to obtain an indication of prevailing engine operating conditions,
 (2) determine an optimum ACT for optimizing a selected engine performance characteristic at a prevailing engine operating condition, and
 (3) automatically adjust at least one engine operating parameter so as to cause the actual ACT to approach the optimum ACT.

38. An engine as defined in claim 37, wherein said air supply system comprises
a turbocharger having an air outlet in fluid communication with the intake ports of the cylinders and having an air inlet, and
a supercharger having an air outlet in fluid communication with said air inlet of said turbocharger and having an air inlet, and
a control device which is coupled to said electronic control means and which selectively controls operation of said supercharger.

39. An engine as defined in claim 37, wherein said air supply system comprises 1) an intercooler located in an air supply line leading to said intake ports and 2) a valve which is coupled to said electronic control means and which is actuatable to selectively permit at least at least partial bypass of said intercooler.

40. An engine as defined in claim 37, wherein said air supply system comprises 1) an expansion turbine located in an air supply line leading to said intake ports and 2) a valve which is coupled to said electronic control means and which is actuatable to selectively permit at least at least partial bypass of said expansion turbine and said aftercooler.

41. An engine as defined in claim 40, wherein said supercharger comprises a portion of a combined supercharger/turboexpander assembly, and wherein said expansion turbine is mounted on a common shaft with a compressor and another turbine of said combined supercharger/turboexpander assembly.

42. An engine as defined in claim 37, further comprising, for each of said cylinders, at least one electronically controlled intake valve and at least one electronically controlled exhaust valve, and wherein said electronic means control is coupled to each of said intake valves and said exhaust valves and controls said intake valves and said exhaust valves so as to obtain the optimum ACT and/or compression temperature.

43. A combined supercharger/turboexpander assembly for use in an internal combustion engine, said assembly comprising:

(A) a rotatable shaft;

(B) a rotary device which is mounted on said shaft and which is configured to be driven by a power source to drive said shaft to rotate;

(C) a compressor which is mounted on said shaft, said compressor having 1) an air inlet and 2) an air outlet configured to be placed in fluid communication with an air inlet of a turbocharger of said engine; and (D) an expansion turbine which is mounted on said shaft, said expansion turbine having 1) a second air inlet configured to be placed in fluid communication with an air outlet of said turbocharger, and 2) a second air outlet in fluid communication with intake ports of cylinders of said engine.

44. An assembly as defined in claim 43, wherein said rotary device is disposed axially between said compressor and said expansion turbine.

45. An assembly as defined in claim 43, wherein said rotary device comprises a hydraulically-driven turbine.

46. A method of optimizing excess air ratio (lambda) in a liquid-fueled compression ignition engine, comprising:

(A) monitoring operation of said engine, the monitoring step including monitoring an engine operating parameter indicative of the actual lambda and then calculating the actual lambda;

(B) determining an optimum lambda for optimizing a selected engine performance characteristic at a prevailing engine speed and load conditions, said optimal lambda varying for different engine speed and load conditions;

(C) automatically adjusting at least one engine operating parameter so as to cause the lambda to selectively increase and decrease to approach the optimum lambda at the prevailing speed and load conditions, the adjusting step comprising 1) obtaining an error signal representative of the difference between the optimum lambda and the actual lambda, and 2) adjusting inlet air pressure for a turbocharger of said engine by a magnitude which is dependent on the magnitude of the error signal; and (D) automatically repeating the steps (A) through (C) in a closed loop and on a cylinder by cylinder and cycle by cycle basis for so long as said engine is operating so as to obtain and maintain an actual lambda which at least essentially equals the optimum lambda.

47. A method as defined in claim 46, wherein the adjusting step comprises adjusting the operation of a supercharger which is located in series with said turbocharger thereby to adjust the inlet air pressure for said turbocharger.

* * * * *